United States Patent
Kawakami et al.

(10) Patent No.: US 7,670,504 B2
(45) Date of Patent: Mar. 2, 2010

(54) NEMATIC LIQUID CRYSTAL COMPOSITION AND LIQUID CRYSTAL DISPLAY DEVICE USING THE SAME

(75) Inventors: Shotaro Kawakami, Kumagaya (JP); Takashi Matsumoto, Kitaadachi-gun (JP); Tetsuo Kusumoto, Ageo (JP); Yoshitaka Saito, Iwatsuki (JP); Yutaka Nagashima, Saitama (JP); Makoto Negishi, Saitama (JP); Masayuki Iwakubo, Kitaadachi-gun (JP)

(73) Assignee: Dainippon Ink & Chemicals, Inc., Tokyo (JP)

( * ) Notice: Subject to any disclaimer, the term of this patent is extended or adjusted under 35 U.S.C. 154(b) by 218 days.

(21) Appl. No.: 11/793,132

(22) PCT Filed: Dec. 14, 2005

(86) PCT No.: PCT/JP2005/022972

§ 371 (c)(1),
(2), (4) Date: Jun. 14, 2007

(87) PCT Pub. No.: WO2006/064853

PCT Pub. Date: Jun. 22, 2006

(65) Prior Publication Data

US 2008/0111107 A1 May 15, 2008

(30) Foreign Application Priority Data

Dec. 15, 2004 (JP) .............................. 2004-362719
Dec. 15, 2004 (JP) .............................. 2004-362720
Jan. 27, 2005 (JP) .............................. 2005-019600

(51) Int. Cl.
C09K 19/00 (2006.01)
C09K 19/06 (2006.01)
C09K 19/52 (2006.01)

(52) U.S. Cl. .............................. 252/299.01; 252/299.6; 252/299.63; 430/20; 430/270.1; 428/1.1

(58) Field of Classification Search ............ 252/299.01, 252/299.6, 299.63; 430/20, 270.1; 428/1.1
See application file for complete search history.

(56) References Cited

U.S. PATENT DOCUMENTS

| 6,692,657 B1 | 2/2004 | Kato et al. |
| 2004/0146662 A1 | 7/2004 | Klasen-Memmer et al. |
| 2009/0050843 A1* | 2/2009 | Kawakami et al. ....... 252/299.6 |

FOREIGN PATENT DOCUMENTS

| DE | 39 06 058 A1 | 9/1989 |
| EP | 0 474 062 A2 | 3/1992 |
| EP | 0969071 | 1/2000 |
| JP | 60-199840 | 10/1985 |
| JP | 2-4725 | 1/1990 |
| JP | 2-503443 | 10/1990 |
| JP | 2-503568 | 10/1990 |
| JP | 8-104869 | 4/1996 |
| JP | 10-120600 | 5/1998 |
| JP | 11-106357 | 4/1999 |
| JP | 11-241068 | 9/1999 |
| JP | 2000-053602 | 2/2000 |
| JP | 2000-96055 | 4/2000 |
| JP | 2001-39906 | 2/2001 |
| JP | 2004-532344 | 10/2004 |

OTHER PUBLICATIONS

Supplementary European Seaarch Report dated Feb. 24, 2009, issued on the corresponding European patent application No. 05 81 6651.3.
H. Numata; "Technical Trend in Liquid Crystal Material;" *Monthly Display*; vol. 4; No. 3; 1998; pp. 1-7/Partial translation (Table 4).

* cited by examiner

*Primary Examiner*—Geraldina Visconti
(74) *Attorney, Agent, or Firm*—Edwards Angell Palmer & Dodge LLP

(57) ABSTRACT

The present invention provides a liquid crystal composition having a negative dielectric anisotropy whose absolute value is large, and a low viscosity, and also provides a VA type liquid crystal element using the same.

Disclosed is a liquid crystal composition containing a compound represented by the general formula (I) and an alkenyl compound represented by the general formula (II):

[Chemical Formula 1]

$$R^1-\text{cyclohexyl}-(\text{cyclohexyl})_m-O-\text{C}_6\text{H}_2\text{F}_2-R^2 \quad (I)$$

$$R^3-B^1-Y^1-(B^2-Y^2)_p-R^4 \quad (II)$$

By combining the liquid compounds according to the present invention, a liquid crystal composition having a low viscosity and a negative dielectric anisotropy could be obtained while nearly maintaining physical properties such as refractive anisotropy. By using the composition, a liquid crystal element having excellent reliability, capable of maintaining a high voltage retention until a high temperature region, is provided, and the display is very applicable as a VA type, ECB type, or IPS type liquid crystal display, and is particularly effective for speeding up response without thinning cell gaps.

22 Claims, No Drawings

NEMATIC LIQUID CRYSTAL COMPOSITION AND LIQUID CRYSTAL DISPLAY DEVICE USING THE SAME

TECHNICAL FIELD

The present invention is a nematic liquid crystal composition having a negative dielectric anisotropy Δ∈ which is useful as an electrooptical liquid crystal material, and a liquid crystal display device using the same.

BACKGROUND ART

The liquid crystal device has becomes used as various home appliances, measuring instruments, panels for automobiles, ward processors, electronic notebooks, printers, computers, and televisions, including clocks and calculators. Typical examples of a liquid crystal system include TN (twist nematic) type, STN (super twist nematic) type, DS (dynamic photo scattering) type, GH (guest host) type, IPS (in-plane switching) type, OCB (optical compensation birefringence) type, ECB (electric control birefringence) type, VA (vertical alignment) type, CSH (color super homeotropic) type, or FLC (ferroelectric liquid crystal). Moreover, as a driving system, multiplex driving is more general than conventional static driving, and a simple matrix system, recently, an active matrix (AM) driven by TFT (thin-film transistor) or TFD (thin-film diode) or the like has become a main stream.

In these display systems, IPS type, ECB type, VA type, CSH type, and so forth, are different from TN type or STN type, and have a characteristic of using a liquid crystal material having a negative dielectric anisotropy (Δ∈). Among them, in particular, the VA-type display by AM driving is now most expected in application to a high-speed display device requiring a wide viewing angle such as television.

Low-power driving, high-speed response, and wide operation temperature range are required for the liquid crystal material used in a display system such as VA type. That is, it is required that the dielectric anisotropy is negative and its absolute value is large and that the viscosity is low and that a transition temperature (Tni) of nematic phase-isotropic liquid phase is high. Moreover, from setting of Δn×d that is the product of refractive anisotropy (Δn) and cell gap (d), the refractive anisotropy of the cleaning liquid material is required to control to be in an appropriate range with being adapted to the cell gap. Moreover, for realizing high-speed response, the cell gap of the display device is made to be small. However, narrowing of the cell gap has been limited from such restriction as described above. For improving a response speed without change the cell gap, it is effective to use to a liquid crystal composition having a low viscosity. In the case of applying the liquid crystal device to television and so forth, high-speed response is emphasized and therefore, it has particularly been required to develop a liquid crystal composition having a low viscosity.

As the liquid crystal material having a negative dielectric anisotropy, there are disclosed the following liquid crystal compounds having a 2,3-difluorophenylene skeleton (see, Japanese Unexamined Patent Application, First Publication No. Sho 60-199840, and Japanese Unexamined Patent Application, First Publication No. Hei 2-4725):

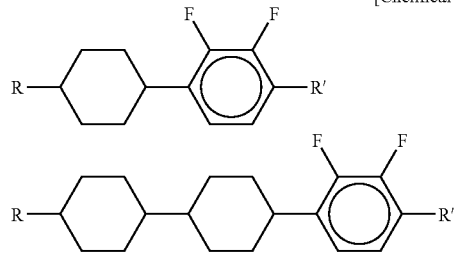

[Chemical Formula 1]

wherein R and R' represents an alkyl group or an alkoxy group having 1 to 10 carbon atoms. Furthermore, these patent documents include compounds having a 1-hydroxy-2,3-difluoro-4-substituted benzene skeleton as a basic skeleton of a liquid crystal compound constituting the invention of the present application. However, various compounds are described in the reference documents and there is no concrete disclosure about a compound having an alkenyl group in the side chain, and the liquid crystal composition having a negative dielectric anisotropy using the described compound does not come to realize a sufficiently low viscosity in the liquid crystal composition requiring high-speed response such as liquid crystal television.

On the other hand, there is disclose of the compound having 1-hydroxy-2,3-difluoro-4-substituted benzene skeleton as a basic skeleton of a liquid crystal compound constituting the invention of the present application (see, Japanese Unexamined Patent Application, First Publication No. Hei 8-104869, Japanese Unexamined Patent Application, First Publication No. 2000-96055, European Patent Application No. EP0474062 (page 14)). However, there is no concrete description of a liquid crystal composition using a compound having an alkenyl group in a side chain, and there is no specific disclosure about what compound should be used with the compound for lowering the viscosity of the liquid crystal composition.

Moreover, the liquid crystal compound having a 2,3-difluorohydroquinone skeleton has already been disclosed (see, Published Japanese Translation No. Hei 2-503568 of the PCT Application, and German Patent Application No. DE3906058), and also there is disclosure of a liquid crystal using the compound. However, the compound has a hydroquinone skeleton and therefore it is considered that the compound cannot be used for the active matrix in voltage retention (see, Hiroshi, Numata, Monthly Display, Vol. 4, No. 3, pp. 1-7, (1998) (page 5, table 4)), and thus the development of a low-viscosity liquid crystal composition for VA using the compound has been delayed.

Accordingly, it has been required to develop a liquid crystal composition having a negative dielectric anisotropy and a low viscosity.

DISCLOSURE OF THE INVENTION

An object to be achieved by the present invention is to provide a liquid crystal composition having a negative dielectric anisotropy whose absolute value is large and a low viscosity without reducing or raising a refractive anisotropy, and to provide a VA type liquid crystal element using the same.

The present inventors have intensively studied so as to achieve the above object, and thus the present invention provides a nematic liquid crystal composition having a negative dielectric anisotropy, comprising:

one, or two or more kinds of compounds represented by the general formula (I):

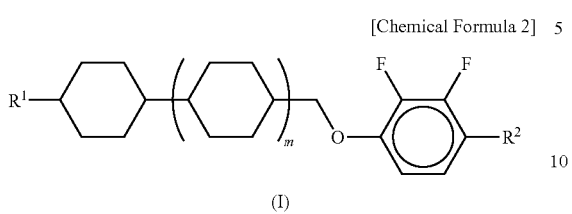

(I)

wherein $R^1$ represents an alkenyl group having 2 to 10 carbon atoms, and one $CH_2$ group or two or more unadjacent $CH_2$ groups existing in the groups may be substituted with O and/or S, and one, or two or more hydrogen atoms existing in these groups may be substituted with F or Cl; and $R^2$ represents an alkyl group having 1 to 10 carbon atoms or an alkoxyl group having 1 to 10 carbon atoms; and m represents 0, 1, or 2) as a first component, the content of which is from 10 to 80% by weight; and one, or two or more kinds of compounds represented by the general formula (II):

[Chemical Formula 3]

wherein $R^3$ and $R^4$ each independently represents an alkyl group having 1 to 10 carbon atoms, an alkenyl group having 2 to 10 carbon atoms, an alkoxyl group having 1 to 10 carbon atoms, or an alkenyloxy group having 3 to 10 carbon atoms; $B^1$ and $B^2$ each independently represents a group selected from the group consisting of:

(a) a trans-1,4-cyclohexylene group (one $CH_2$ group or two unadjacent $CH_2$ groups existing in the group may be substituted with an oxygen atoms or a sulfur atom), (b) a 1,4-phenylene group (one, or two or more CH groups existing in the group may be substituted with a nitrogen atom), (c) a cyclohexan-1,4-dily group, a bicyclo[2.2.2]octan-1,4-diyl group, a piperidin-1,4-diyl group, a naphthalen-2,6-diyl group, a decahydronaphthalen-2,6-diyl group, and a 1,2,3,4-tetrahydronaphthalen-2,6-diyl group, and the group (a), the group (b), or the group (c) may be substituted with CN or halogen;

$Y^1$ and $Y^2$ each independently represents —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —C≡C—, —$CF_2O$—, —$OCF_2$—, —COO—, —OCO—, —COS—, —SCO—, or a single bond, and when a plurality of $Y^2$ or $B^2$ exist, they may be same or different; and P represents 0, 1, or 2 as a second component, the content of which is from 20 to 70% by weight.

The present invention also provides a preferable difluorobenzene derivative represented by the general formula (I):

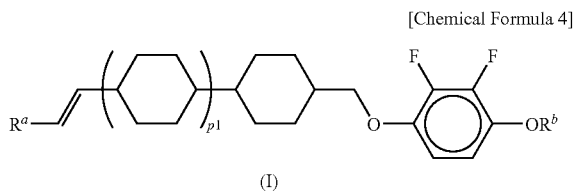

(I)

wherein $R^a$ represents a hydrogen atom or a linear alkyl group having 1 to 3 carbon atoms, $R^b$ represents a linear alkyl group having 1 to 7 carbon atoms, and p1 represents 0, 1, or 2, among the compounds represented by the general formula (I).

By combining the liquid crystal compound of the present invention, a liquid crystal composition having a low viscosity and a negative dielectric anisotropy could be obtained while almost maintaining a refractive anisotropy. By using the composition, a liquid crystal element having excellent reliability, capable of maintaining a high voltage retention until a high temperature region is provided, and this display is very applicable as VA type, ECB type, or IPS type liquid crystal and is particularly effective for speeding up response without thinning cell gaps.

BEST MODE FOR CARRYING OUT THE INVENTION

The crystal composition in the invention of the present application contains one, or two or more kinds of compounds represented by the general formula (I) as a first component. However, one to twenty kinds of compounds are preferable. One kind to fifteen kinds of compounds are more preferable. One kind to ten kinds of compounds still more preferable. One kind to eight kinds of compounds are particularly preferable.

The compound represented by the general formula (I) has a negative dielectric anisotropy whose absolute value is large. However, if the content is large, the viscosity tends to be raised. Moreover, a smectic-nematic phase transition temperature occasionally increases and therefore, in the case of emphasizing a low viscosity, or in the case of emphasizing a low smectic-nematic phase transition temperature, it is preferable that the content is small. In the case of emphasizing a negative dielectric anisotropy whose absolute value is large, it is preferable that the content is large.

In the general formula (I), $R^1$ preferably represents an alkenyl group having 2 to 10 carbon atoms or an alkenyl group having 2 to 7 carbon atoms which is substituted with an alkoxyl group having 1 to 5 carbon atoms. $R^1$ more preferably represents an alkenyl group having 2 to 7 carbon atoms. Specifically, particularly preferable structures (1) to (5) are as follows:

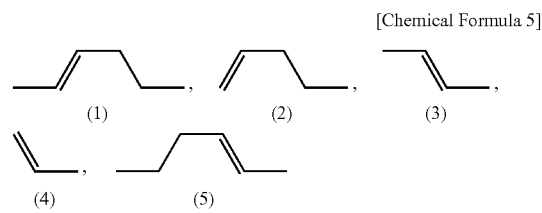

wherein the right end of each of the structural formulas is connected to the ring.

$R^2$ preferably represents an alkyl group having 1 to 7 carbon atoms or an alkoxyl group having 1 to 7 carbon atoms.

Described in more detail, specific skeletons of the general formula (I) are preferably the compounds represented by the following general formulas (I-A) and (I-B):

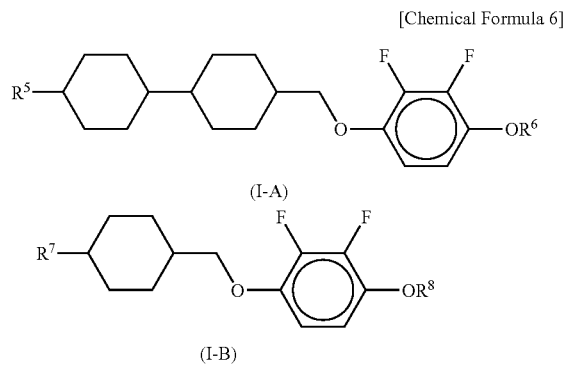

wherein $R^5$ and $R^7$ each independently represents the same meaning as $R^1$ in the general formula (I), and $R^6$ and $R^8$ each independently represents an alkyl group having 1 to 10 carbon atoms.

Specific skeletons of the general formulas (I-A) and (I-B) are more preferably compounds represented by the group consisting of the general formulas (I-A-I) to (I-A-IV) and general formulas (I-B-I) to (I-B-IV):

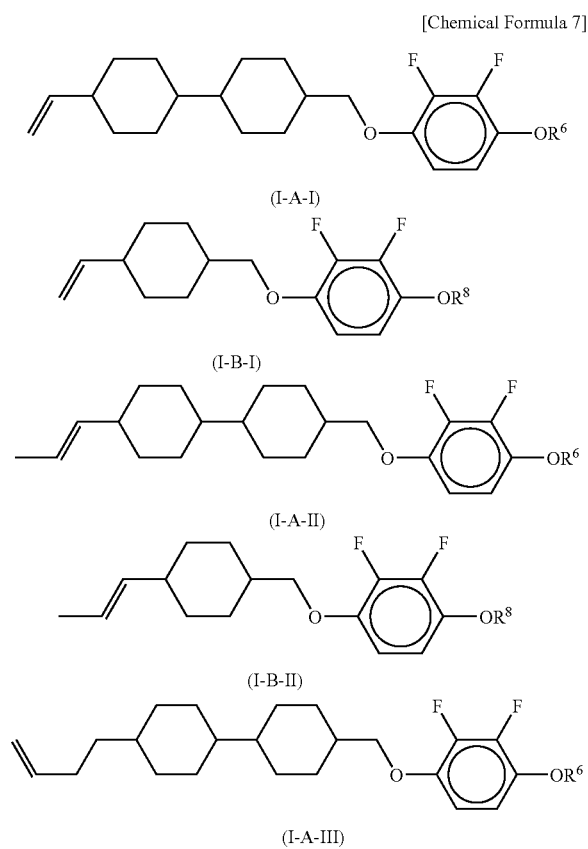

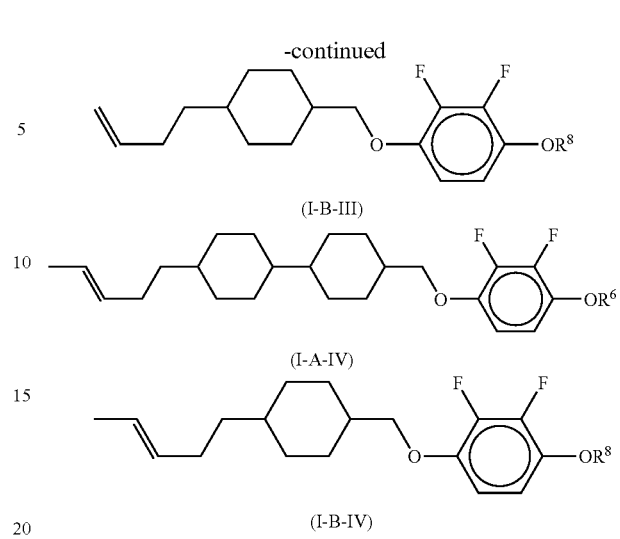

wherein $R^6$ and $R^8$ each independently represents an alkyl group having 1 to 7 carbon atoms.

As the second component, one, or two or more kinds of compounds represented by the general formula (II) are contained. However, one to twelve kinds of compounds are preferable. One to eight kinds of compounds are more preferable. One to six kinds of compounds are still more preferable.

The compounds represented by the general formula (II) have little effect of enhancing the absolute value of the dielectric anisotropy but has the effect of lowering the viscosity. In the case of emphasizing a low viscosity, the content is preferably large. In the case of emphasizing enhancement of the absolute value of the dielectric anisotropy, the content is preferably small.

In the general formula (II), $R^3$ and $R^4$ each independently represents an alkyl group having 1 to 10 carbon atoms, an alkenyl group having 2 to 10 carbon atoms, an alkoxyl group having 1 to 10 carbon atoms, or an alkenyloxy group having 3 to 10 carbon atoms. However, it is more preferable that $R^3$ represents an alkyl group having 1 to 10 carbon atoms or an alkenyl group having 2 to 10 carbon atoms and that $R^4$ represents an alkyl group having 1 to 10 carbon atoms or an alkoxyl group having 1 to 10 carbon atoms or an alkenyl group having 2 to 10 carbon atoms. It is still more preferable that $R^3$ represents an alkyl group having 1 to 5 carbon atoms or an alkenyl group having 2 to 5 carbon atoms and that $R^4$ represents an alkyl group having 1 to 5 carbon atoms or an alkoxyl group having 1 to 5 carbon atoms or an alkenyl group having 2 to 5 carbon atoms. It is more preferable that at least one of $R^3$ and $R^4$ represents an alkenyl group.

Specific examples of $R^3$ includes $—CH_3$, $—CH_2CH_3$, $—(CH_2)_2CH_3$, $—(CH_2)_3CH_3$, $—(CH_2)_4CH_3$, $—(CH_2)_5CH_3$, $—(CH_2)_6CH_3$, $—(CH_2)_7CH_3$, $—CH=CH_2$, $—CH=CHCH_3$ (E isomer), $—(CH_2)_2CH=CH_2$, $—(CH_2)_2CH=CHCH_3$ (E isomer), $—(CH_2)_4CH=CH_2$, $—(CH_2)_4CH=CHCH_3$ (E isomer), or $—(CH_2)_6CH=CH_2$.

Specific examples of $R^4$ include $—CH_3$, $—CH_2CH_3$, $—(CH_2)_2CH_3$, $—(CH_2)_3CH_3$, $—(CH_2)_4CH_3$, $—(CH_2)_5CH_3$, $—(CH_2)_6CH_3$, $—(CH_2)_7CH_3$, $—OCH_3$, $—OCH_2CH_3$, $—O(CH_2)_2CH_3$, $—O(CH_2)_3CH_3$, $—O(CH_2)_4CH_3$, $—O(CH_2)_5CH_3$, $—O(CH_2)_6CH_3$, $—O(CH_2)_7CH_3$, $—CH=CH_2$, $—CH=CHCH_3$ (E isomer), $—(CH_2)_2CH=CH_2$, $—(CH_2)_2CH=CHCH_3$ (E isomer), $—(CH_2)_4CH=CH_2$, $—(CH_2)_4CH=CHCH_3$ (E isomer), or $—(CH_2)_6CH=CH_2$.

It is preferable that $B^1$ and $B^2$ each independently represents a trans-1,4-cyclohexylene group (including the case that one $CH_2$ group or two unadjacent $CH_2$ groups existing in the group are substituted with an oxygen atom), a 1,4-phenylene group (including the case that one, or two or more CH groups existing in the group are substituted with a nitrogen atom), a cyclohexan-1,4-diyl group, a bicyclo[2.2.2]octan-1,4-diyl group, a piperidin-1,4-diyl group, a naphthalen-2,6-diyl group, a decahydronaphthalen-2,6-diyl group, a 1,2,3,4-tetrahydronaphthalen-2,6-diyl group, or derivatives thereof in which the hydrogen atoms of the base groups are substituted with fluorine atoms. It is still more preferable that $B^1$ and $B^2$ each represents a trans-cyclohexan-1,4-diyl group, a 1,4-phenylene group, a fluorine-substituted 1,4-phenylene group, or a bicyclo[2.2.2]octan-1,4-diyl group. It is particularly preferable that $B^1$ and $B^2$ each represents a trans-cyclohexan-1,4-diyl group or a 1,4-phenylene group.

It is preferable that $Y^1$ and $Y^2$ each independently represents —$CH_2CH_2$—, —CH=CH-(E isomer), —$CH(CH_3)CH_2$—, —$CH_2CH(CH_3)$—, —$CH(CH_3)CH(CH_3)$—, —$CF_2CF_2$—, —CF=CF-(E isomer), —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —C≡C—, —$CF_2O$—, —$OCF_2$—, —COO—, —OCO—, —COS—, —SCO—, or a single bond. —$CH_2CH_2$—, —CH=CH-(E isomer), —$CH(CH_3)CH_2$—, —$CH_2CH(CH_3)$—, —$CF_2CF_2$—, —CF=CF-(E isomer), —$CH_2O$—, —$OCH_2$—, —$OCH(CH_3)$—, —$CH(CH_3)O$—, —C≡C—, —$CF_2O$—, —$OCF_2$— or a single bond is still more preferable.

Describing in more detail, as a specific structure of the general formula (II), preferable compounds are compounds represented by the group consisting of the following general formulas (II-A) to (II-G):

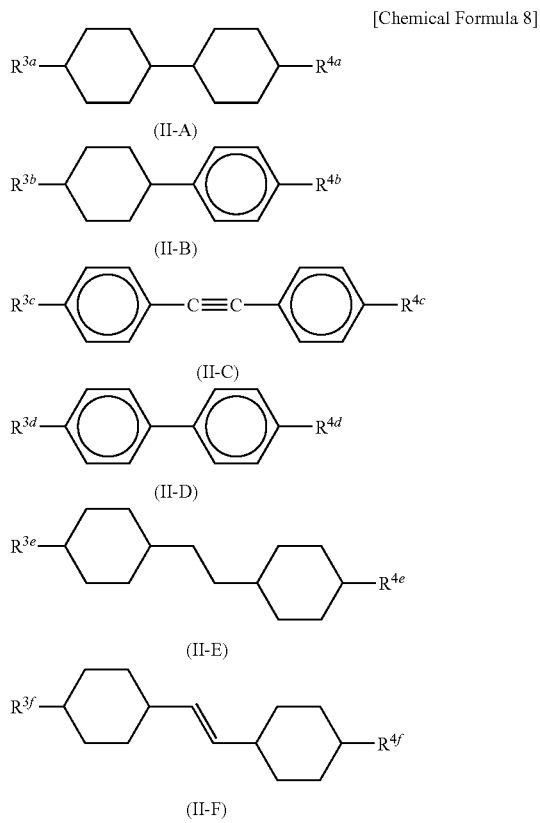

(II-A)

(II-B)

(II-C)

(II-D)

(II-E)

(II-F)

[Chemical Formula 8]

(II-G)

wherein $R^{3a}$, $R^{3b}$, $R^{3c}$, $R^{3d}$, $R^{3e}$, $R^{3f}$, $R^{3g}$, $R^{4a}$, $R^{4b}$, $R^{4c}$, $R^{4d}$, $R^{4e}$, $R^{4f}$, and $R^{4g}$ each independently represents the same meaning as $R^3$ and $R^4$ in the general formula (II))

It is preferable that $R^{3a}$, $R^{3b}$, $R^{3c}$, $R^{3d}$, $R^{3e}$, $R^{3f}$ and $R^{3g}$ represent —$CH_3$, —$CH_2CH_3$, —$(CH_2)_2CH_3$, —$(CH_2)_3CH_3$, —$(CH_2)_4CH_3$ —CH=$CH_2$, —CH=$CHCH_3$ (E isomer), —$(CH_2)_2CH$=$CH_2$, and —$(CH_2)_2CH$=$CHCH_3$ (E isomer), and $R^{4a}$, $R^{4b}$, $R^{4c}$, $R^{4d}$, $R^{4e}$, $R^{4f}$, and $R^{4g}$ represent —$CH_3$, —$CH_2CH_3$, —$(CH_2)_2CH_3$, —$(CH_2)_3CH_3$, —$(CH_2)_4CH_3$, —$(CH_2)_5CH_3$, —$(CH_2)_6CH_3$, —$(CH_2)_7CH_3$, —$OCH_3$, —$OCH_2CH_3$, —$O(CH_2)_2CH_3$, —$O(CH_2)_3CH_3$, —$O(CH_2)_4CH_3$, —CH=$CH_2$, —CH=$CHCH_3$ (E isomer), —$(CH_2)_2CH$=$CH_2$, and —$(CH_2)_2CH$=$CHCH_3$ (E isomer).

As a compound of the general formula in which at least one of $R^3$ or $R^4$ represents an alkenyl group, compounds represented by the following formulas (II-A-1) to (II-A-8), (II-B-1) to (II-B-7), (II-C-1) to (II-C-6), and (II-D-1) to (II-D-5) are preferable.

General Formulas (II-A-1) to (II-A-8):

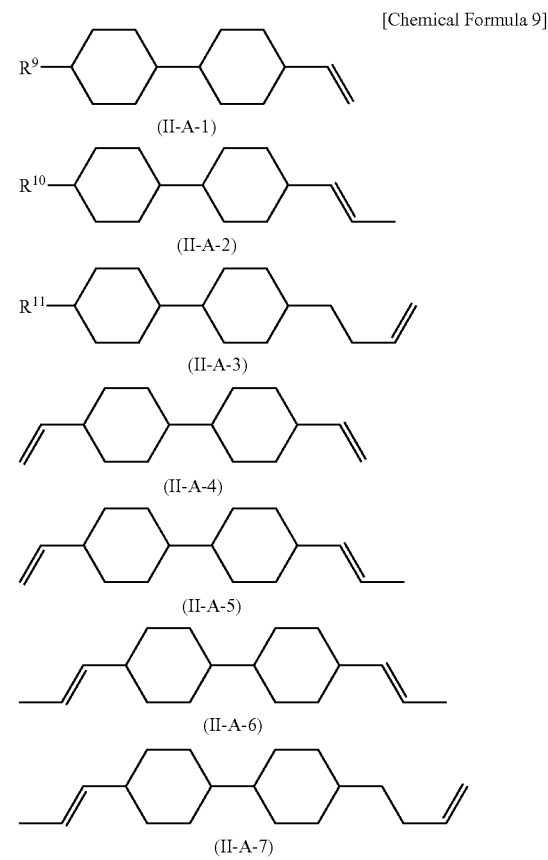

[Chemical Formula 9]

(II-A-1)

(II-A-2)

(II-A-3)

(II-A-4)

(II-A-5)

(II-A-6)

(II-A-7)

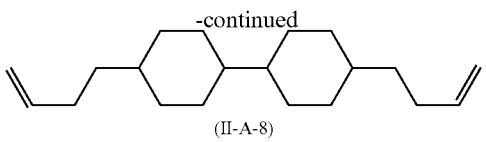

(II-A-8)

wherein $R^9$, $R^{10}$, and $R^{11}$ each independently represents an alkyl group having 1 to 10 carbon atoms, and one $CH_2$ group or two or more unadjacent $CH_2$ groups existing in the groups may be substituted with O and/or S, and one, or two or more hydrogen atoms existing in the groups may be substituted with F or Cl.

It is preferable that $R^9$, $R^{10}$, and $R^{11}$ represent $—CH_3$, $—CH_2CH_3$, $—(CH_2)_2CH_3$, $—(CH_2)_3CH_3$, $—(CH_2)_4CH_3$, $—(CH_2)_5CH_3$, $—(CH_2)_6CH_3$, $—(CH_2)_7CH_3$, $—OCH_3$, $—OCH_2CH_3$, $—O(CH_2)_2CH_3$, $—O(CH_2)_3CH_3$, $—O(CH_2)_4H_3$, $—O(CH_2)_5CH_3$, $—O(CH_2)_6CH_3$, or $—O(CH_2)_7CH_3$. It is more preferable that they represents $—CH_3$, $—CH_2CH_3$, $—(CH_2)_2CH_3$, $—(CH_2)_3CH_3$, or $—(CH_2)_4CH_3$.

Among the compounds represented by the general formulas (II-A-1) to (II-A-8), the compounds represented by the general formula (II-A-1), (II-A-2), and (II-A-3) are particularly preferable.

General Formulas (II-B-1) to (II-B-7):

[Chemical Formula 10]

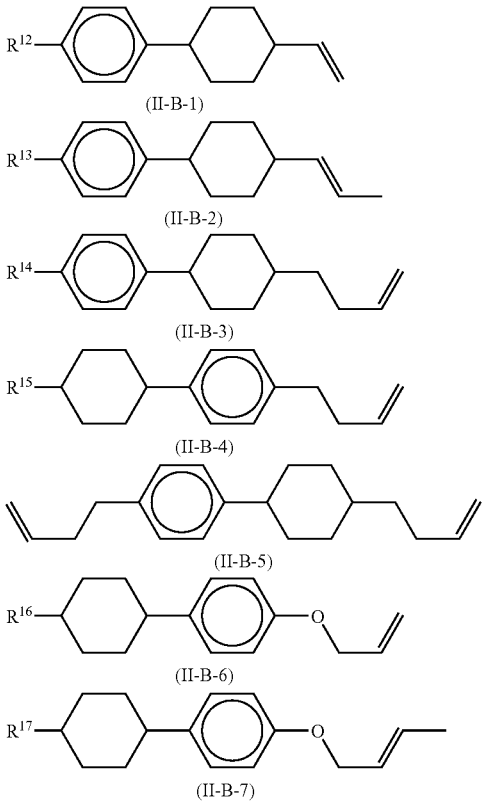

wherein each of $R^{12}$, $R^{13}$, $R^{14}$, $R^{15}$, $R^{16}$, and $R^{17}$ independently represents an alkyl group having 1 to 10 carbon atoms, and one $CH_2$ group or two or more unadjacent $CH_2$ groups existing in the groups may be substituted with O and/or S, and one, or two or more hydrogen atoms existing in the groups may be substituted with F or Cl.

It is preferable that $R^{12}$, $R^{13}$, $R^{14}$, $R^{15}$, $R^{16}$, and $R^{17}$ represent $—CH_3$, $—CH_2CH_3$, $—(CH_2)_2CH_3$, $—(CH_2)_3CH_3$, $—(CH_2)_4CH_3$, $—(CH_2)_5CH_3$, $—(CH_2)_6CH_3$, $—(CH_2)_7CH_3$, $—OCH_3$, $—OCH_2CH_3$, $—O(CH_2)_2CH_3$, $—O(CH_2)_3CH_3$, $—O(CH_2)_4CH_3$, $O(CH_2)_5CH_3$, $—O(CH_2)_6CH_3$ or $—O(CH_2)_7CH_3$. It is more preferable that they represent $—CH_3$, $—CH_2CH_3$, $—(CH_2)_2CH_3$, $—(CH_2)_3CH_3$, $—(CH_2)_4CH_3$.

General Formulas (II-C-1) to (II-C-6):

[Chemical Formula 11]

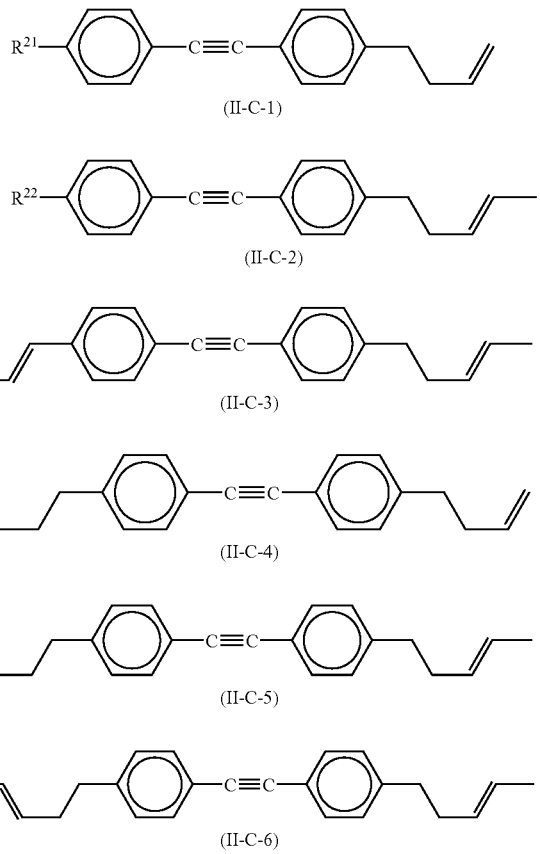

wherein $R^{21}$ and $R^{22}$ each independently represents an alkyl group having 1 to 10 carbon atoms, and one $CH_2$ group or two or more unadjacent $CH_2$ groups existing in the groups may be substituted with O and/or S, and one, or two or more hydrogen atoms existing in the groups may be substituted with F or Cl.

It is preferable that $R^{21}$ and $R^{22}$ represent $—CH_3$, $—CH_2CH_3$, $—(CH_2)_2CH_3$, $—(CH_2)_3CH_3$, $—(CH_2)_4CH_3$, $—(CH_2)_5CH_3$, $—(CH_2)_6CH_3$, $—(CH_2)_7CH_3$, $—OCH_3$, $—OCH_2CH_3$, $—O(CH_2)_2CH_3$, $—O(CH_2)_3CH_3$, $—O(CH_2)_4CH_3$, $—O(CH_2)_5CH_3$, $—O(CH_2)_6CH_3$, or $—O(CH_2)_7CH_3$. It is more preferable that they represent $—CH_3$, $—CH_2CH_3$, $—(CH_2)_2CH_3$, $—(CH_2)_3CH_3$, or $—(CH_2)_4CH_3$.

Among the compounds represented by the general formulas (II-C-1) to (II-C-6), the compounds represented by the general formula (II-C-1), (II-C-2), and (II-C-4) are particularly preferable.

General Formulas (II-D-1) to (II-D-5):

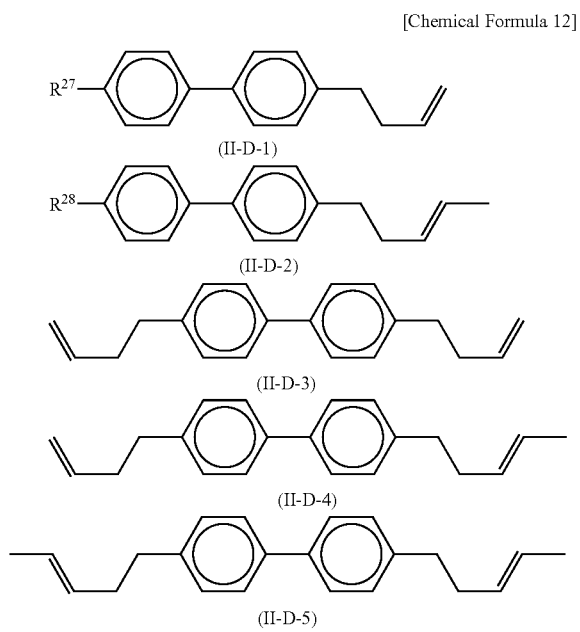

wherein $R^{27}$ and $R^{28}$ each independently represents an alkyl group having 1 to 10 carbon atoms, and one $CH_2$ group or two or more unadjacent $CH_2$ groups existing in the groups may be substituted with O and/or S, and one, or two or more hydrogen atoms existing in the groups may be substituted with F or Cl.

It is preferable that $R^{27}$ and $R^{28}$ represent —$CH_3$, —$CH_2CH_3$, —$(CH_2)_2CH_3$, —$(CH_2)_3CH_3$, —$(CH_2)_4CH_3$, —$(CH_2)_5CH_3$, —$(CH_2)_6CH_3$, —$(CH_2)_7CH_3$, —$OCH_3$, —$OCH_2CH_3$, —$O(CH_2)_2CH_3$, —$O(CH_2)_3CH_3$, —$O(CH_2)_4CH_3$, —$O(CH_2)_5CH_3$, —$O(CH_2)_6CH_3$, or —$O(CH_2)_7CH_3$. It more preferable that they represent —$CH_3$, —$CH_2CH_3$, —$(CH_2)_2CH_3$, —$(CH_2)_3CH_3$, —$(CH_2)_4CH_3$.

It is preferable that the nematic liquid crystal composition of the present invention contains one, or two or more kinds of compounds selected from the group consisting of compounds represented by the general formula (I-A) and the general formula (I-B) and contains a compound represented by the general formula (II-A), (II-B), (II-C), or (II-F). It is more preferable that the nematic liquid crystal composition contains one, or two or more kinds of compounds selected from the group consisting of compounds represented by the general formula (I-A) and the general formula (I-B) and contains a compound represented by the general formula (II-A) or (II-F). Also, it is preferable that the nematic liquid crystal composition contains one, or two or more kinds of compounds selected from the group consisting of compounds represented by the general formula (I-A) and the general formula (I-B) and contains a compound represented by the general formula (IIA-1), (IIA-2), or (IIA-3). Also, it is preferable that the nematic liquid crystal composition contains one, or two or more kinds of compounds selected from the group consisting of compounds represented by the general formula (I-A) and the general formula (I-B) and contains a compound represented by the general formula (II-C-1), (II-C-2), or (II-C-4). It is preferable that the nematic liquid crystal composition of the present invention contains 10 to 80% by weight of one, or two or more kinds of compounds selected from the group consisting of compounds represented by the general formula (I-A) and the general formula (I-B), and contains 20 to 70% by weight of, one, or two or more kinds of compounds selected from the group consisting of compounds represented by the general formulas (II-A-1) to (II-A-8), and/or one, or two or more kinds of compounds selected from the group consisting of compounds represented by the general formulas (II-B-1) to (II-B-7), and/or one, or two or more kinds of compounds selected from the group consisting of compounds represented by the general formulas (II-C-1) to (II-C-6), and/or one, or two or more kinds of compounds selected from the group consisting of compounds represented by the general formulas (II-D-1) to (II-D-5).

It is more preferable that the nematic liquid crystal composition contains 10 to 80% by weight of one, or two or more kinds of compounds selected from the group consisting of compounds represented by the general formulas (I-A-I) to (1-A-IV) and the general formulas (I-B-I) to (I-B-IV), and contains 20 to 70% by weight of, one, or two or more kinds of compounds selected from the group consisting of compounds represented by the general formulas (II-A-1) to (II-A-8), and/or one, or two or more kinds of compounds selected from the group consisting of compounds represented by the general formulas (II-B-1) to (II-B-7), and/or one, or two or more kinds of compounds selected from the group consisting of compounds represented by the general formulas (II-C-1) to (II-C-6), and/or one, or two or more kinds of compounds selected from the group consisting of compounds represented by the general formulas (II-D-1) to (II-D-5).

It is more preferable that the nematic liquid crystal composition contains 20 to 70% by weight of, one, or two or more kinds of compounds selected from the group consisting of compounds represented by the general formulas (I-A-I) to (I-A-IV) and (I-B-I) to (I-B-IV). It is still more preferable to contain 30 to 60% by weight of the compounds.

It is more preferable to contain 30 to 60% by weight of one, or two or more kinds of compounds selected from the group consisting of compounds represented by the general formulas (II-A-1) to (II-A-8), and/or one, or two or more kinds of compounds selected from the group consisting of compounds represented by the general formulas (II-B-1) to (II-B-7), and/or one, or two or more kinds of compounds selected from the group consisting of compounds represented by the general formulas (II-C-1) to (II-C-6), and/or one, or two or more kinds of compounds selected from the group consisting of compounds represented by the general formulas (II-D-1) to (II-D-5). It is still more preferable to contain 40 to 50% by weight of the compounds.

It is preferable to contain, as an additional compound, one, or two or more kinds of compounds selected from the group consisting of compounds represented by the general formulas (III-A) to (III-J):

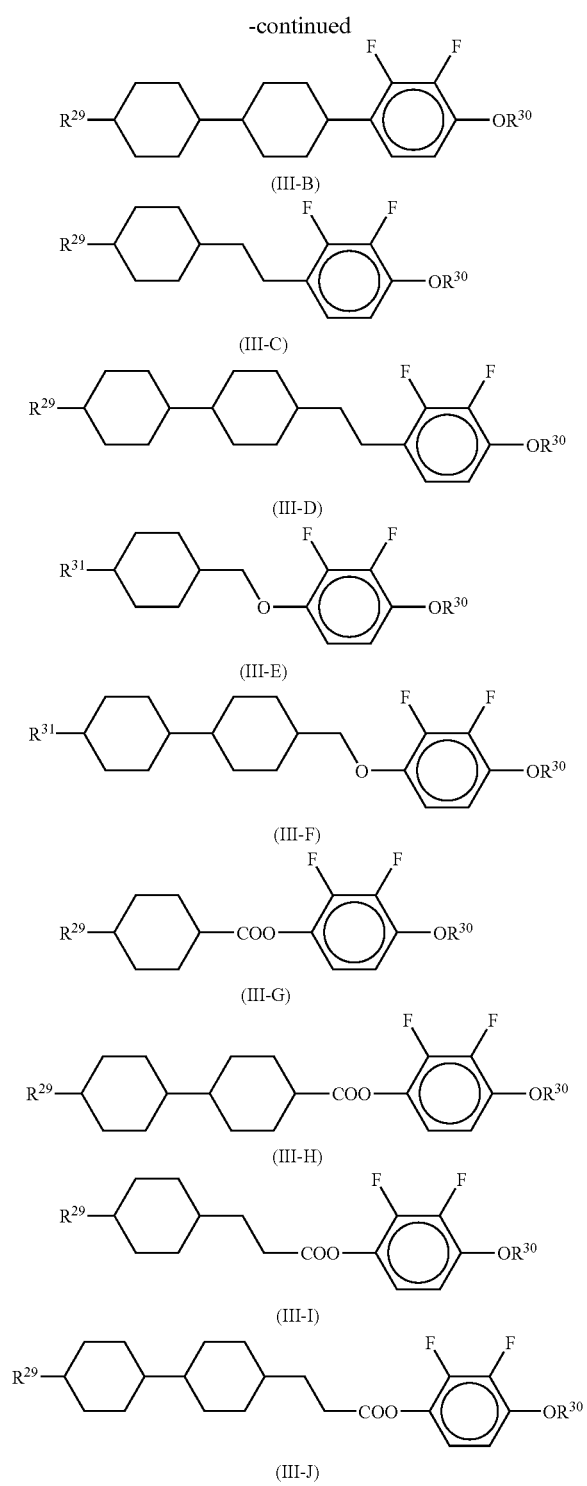

wherein $R^{29}$ and $R^{30}$ independently represents an alkyl group having 1 to 10 carbon atoms or an alkenyl group having 2 to 10 carbon atoms, one $CH_2$ group or two or more unadjacent $CH_2$ groups existing in the groups may be substituted with O and/or S, and one, or two or more hydrogen atoms existing in the groups may be substituted with F or Cl, and $R^{31}$ represents an alkyl group having 1 to 10 carbon atoms, one $CH_2$ group or two or more unadjacent $CH_2$ groups existing in the groups may be substituted with O and/or S, and one, or two or more hydrogen atoms existing in the groups may be substituted with F or Cl.

In the formula, it is preferable that $R^{29}$ represents $-CH_3$, $-CH_2CH_3$, $-(CH_2)_2CH_3$, $-(CH_2)_3CH_3$, $-(CH_2)_4CH_3$, $-(CH_2)_5CH_3$, $-(CH_2)_6CH_3$, $-(CH_2)_7CH_3$, $-CH=CH_2$, $-CH=CHCH_3$ (E isomer), $-(CH_2)_2CH=CH_2$, $-(CH_2)_2CH=CHCH_3$ (E isomer), $-(CH_2)_4CH=CH_2$, $-(CH_2)_4CH=CHCH_3$ (E isomer), or $-(CH_2)_6CH=CH_2$, and $R^{30}$ represents $-CH_3$, $-CH_2CH_3$, $-(CH_2)_2CH_3$, $-(CH_2)_3CH_3$, $-(CH_2)_4CH_3$, $-(CH_2)_5CH_3$, $-(CH_2)_6CH_3$, $-(CH_2)_7CH_3$, $-(CH_2)_2CH=CH_2$, $-(CH_2)_2CH=CHCH_3$ (E isomer), $-(CH_2)_4CH=CH_2$, $-(CH_2)_4CH=CHCH_3$ (E isomer) or $-(CH_2)_6CH=CH_2$.

Among the compounds represented by the general formulas (III-A) to (III-J), the compounds represented by the general formula (III-E) or (III-F) are more preferable.

In the liquid crystal composition of the present invention, a transition temperature Tni of nematic phase-isotropy liquid phase is preferably 70° C. or higher, more preferably 75° C. or higher, and still more preferably 80° C. or higher. A dielectric anisotropy (Δ∈) at 25° C. is preferably −2 or less, more preferably −2.5 or less, and still more preferably −3.0 or less. In the case of corresponding to thin cell gaps, a refractive anisotropy Δn at 25° C. is preferably 0.10 or more, and more preferably 0.12 or more. In the case of corresponding to thick cell gaps, a refractive anisotropy is preferably 0.095 or less, and more preferably 0.085 or less. A viscosity is preferably 30 mPa·s or less, more preferably 25 mPa·s or less, and still more preferably 20 mPa·s or less.

As described above, it is preferable that the dielectric anisotropy Δ∈ at 25° C. is within a range from −2.0 to −8.0, the refractive anisotropy Δn at 25° C. is within a range from 0.06 to 0.16, the viscosity at 20° C. is within a range from 10 to 30 mPa·s, and the transition temperature Tni of nematic phase-isotropy liquid phase is within a range from 70 to 130° C.

The above nematic liquid crystal is useful for a liquid crystal display device, and particularly useful for a liquid crystal display device for active matrix drive, and can be used for a VA type, IPS type, or ECB type liquid crystal display device.

The nematic liquid crystal composition of the present invention may contain a general nematic liquid crystal, a smectic liquid crystal, or a costeric liquid crystal, including the above components.

Preparation examples of the compounds represented by the general formula (I) constituting the invention of the present application will now be described.

(Preparation Method 1)

A diketone compound represented by the formula (9):

[Chemical Formula 14]

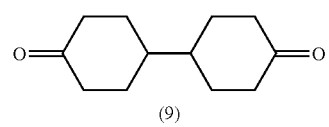

(9)

is reacted with ylide prepared from methoxymethyltriphenylphosphonium chloride to obtain a compound represented by the formula (10):

[Chemical Formula 15]

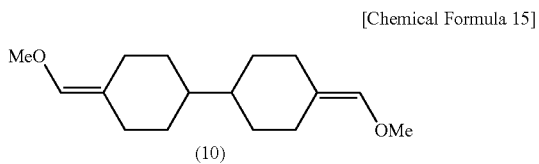

(10)

The resulting compound of the formula (10) is hydrolyzed with an acid catalyst, and cis-trans-isomerized under a basic condition to obtain a compound represented by the formula (11):

[Chemical Formula 16]

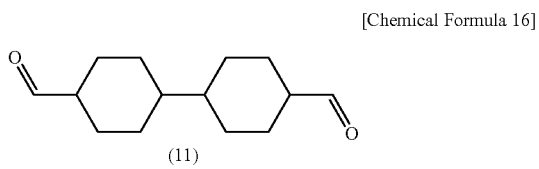

(11)

The resulting compound of the formula is reacted with ylide prepared from methoxymethyltriphenylphosphonium bromide to obtain a compound represented by the formula (12):

[Chemical Formula 17]

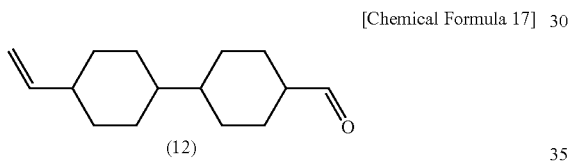

(12)

The resulting compound of the formula (12) is reduced using a reducing agent such as sodium borohydride to obtain a compound represented by the formula (13):

[Chemical Formula 18]

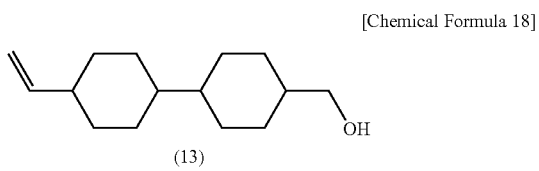

(13)

The resulting compound of the formula (13) is converted into the compound represented by the formula (14):

[Chemical Formula 19]

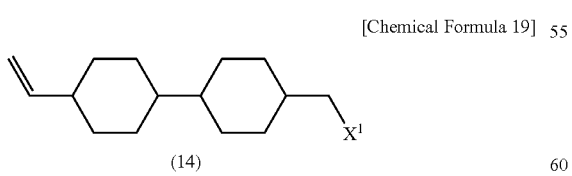

(14)

wherein $X^1$ represents chlorine, bromine, iodine, a benzenesulfonyloxy group, a p-toluenesulfonyloxy group, a methanesulfonyloxy group, or a trifluoromethanesulfonyloxy group, and then extracted with phenolate prepared from a phenol compound represented by the general formula (15):

[Chemical Formula 20]

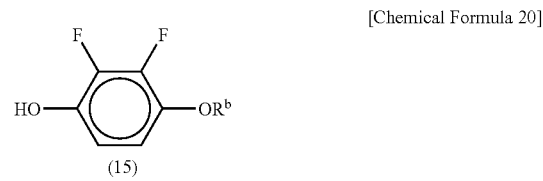

(15)

wherein $R^b$ represents the same meaning as the formula (1)) to obtain a compound represented by the formula (16):

[Chemical Formula 21]

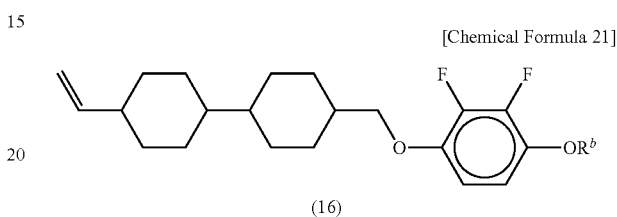

(16)

wherein $R^b$ represents the same meaning as the formula (1)).

(Preparation Method 2)

The compound represented by the formula (17):

[Chemical Formula 22]

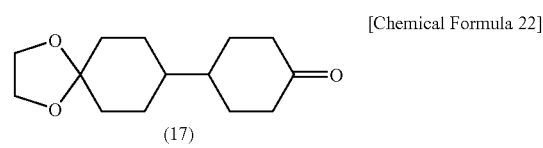

(17)

is subjected to the same reaction as the conversion of the formulas (9) to (11) to obtain a compound represented by the formula (18):

[Chemical Formula 23]

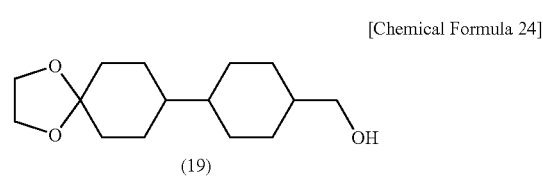

(18)

The resulting compound of the formula (18) is reduced with a reducing agent such as sodium borohydride to obtain a compound represented by the formula (19):

[Chemical Formula 24]

(19)

The resulting compound represented by the formula (19) is converted into a compound represented by the general formula (20):

[Chemical Formula 25]

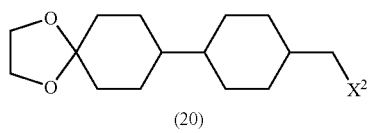

(20)

wherein $X^2$ represents the same meaning as $X^1$ in the general formula (14)) and then deprotected under an acidic condition to obtain a compound represented by the general formula (21):

[Chemical Formula 26]

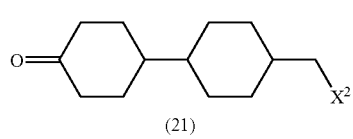

(21)

wherein $X^2$ represents the same meaning as $X^1$ in the general formula (14)). The resulting compound represented by the general formula (21) is subjected to the same reaction as the conversion from the formulas (9) to (11) to obtain a compound represented by the formula (22):

[Chemical Formula 27]

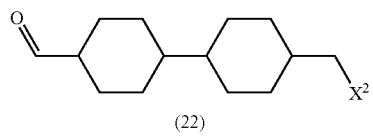

(22)

wherein $X^2$ represents the same meaning as $X^1$ in the general formula (14)). The resulting compound represented by the general formula (22) is reduced with a reducing agent such as sodium borohydride to obtain a compound represented by the general formula (23):

[Chemical Formula 28]

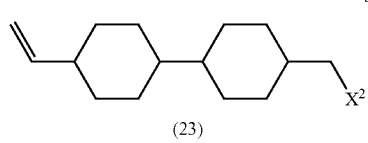

(23)

wherein $X^2$ represents the same meaning as $X^1$ in the general formula (14). The resulting compound represented by the general formula (23) is reacted with phenolate prepared from a phenol compound represented by the general formula (15) to obtain a compound represented by the general formula (16).

(Preparation Method 3)

The compound represented by the formula (24):

[Chemical Formula 29]

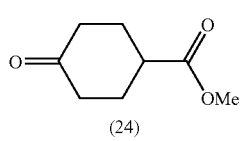

(24)

is subjected to the same reaction as the conversion of the formulas (9) to (12) to obtain a compound represented by the formula (25):

[Chemical Formula 30]

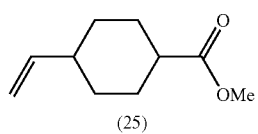

(25)

The resulting compound represented by the formula (25) is reduced with a reducing agent such as lithium aluminum hydride and sodium bis(2-methoxyethoxy)aluminum hydride to obtain a compound represented by the formula (26)

[Chemical Formula 31]

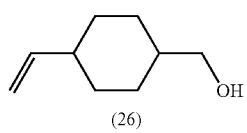

(26)

The resulting compound represented by the formula (26) is converted into the compound represented by the general formula (27):

[Chemical Formula 32]

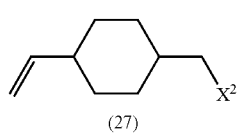

(27)

wherein $X^3$ represents the same meaning as $X^1$ in the general formula (14)), and then reacted with phenolate prepared from a phenol compound represented by the general formula (15) to obtain a compound represented by the general formula (28):

[Chemical Formula 33]

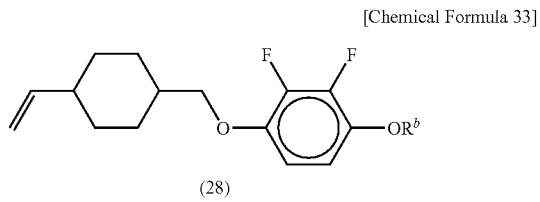

(28)

wherein $R^b$ represents the same meaning as the general formula (I)).

EXAMPLES

The resent invention will now be described in detail by way of Examples, but the present invention is not limited to the following Examples. The structures of the compounds were confirmed by nuclear magnetic spectrum (NMR) and mass spectrum (MS). Moreover, in the compositions of the following Examples and Comparative Examples, percentages are by mass.

In the Examples, the measured characteristics are as follows.

Tni: transition temperature of nematic phase-isotropy liquid phase (° C.)

Δn: birefringence at 25° C.

Δ∈: dielectric anisotropy at 25° C.

η: viscosity (mPa·s) (20° C.)

The following abbreviations are used for the description of the compounds.

THF: tetrahydrofuran
DMF: N,N-dimethylformamide
Me: methyl group
Et: ethyl group
Bu: butyl group
Pen: pentyl group
Pr: propyl group
Ph: phenyl group
Ms: methane sulfonyl group

Example 1

Synthesis of 1-ethoxy-2,3-difluoro-4-(trans-4-vinyl-cyclohexyl)methoxybenzene (Ia)

(1-1) Synthesis of 2,3-difluoro-4-ethoxyphenol

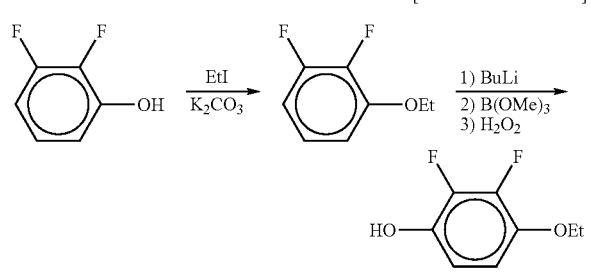

[Chemical Formula 34]

(1-1-1) Synthesis of 2,3-difluoro-1-ethoxybenzene 130.1 g of 2,3-difluoro phenol and 234.0 g of ethyl iodide were dissolved in 650 mL of acetone, and 207.3 g of anhydrous potassium carbonate was added and refluxed for 2 hours, followed by cooling to room temperature. After filtration, the filtrate was concentrated and 600 mL of hexane was added to the residue, and then the organic layer was sequentially washed in turn with water and saturated saline. The organic layer was dried over anhydrous sodium sulfate and then concentrated to obtain 190 g of a reaction mixture. The reaction mixture was vacuum distilled to obtain 134.1 g of 2,3-difluoro-1-ethoxybenzene as an oily substance. Its boiling point is 95 to 96° C./57 hPa.

(1-1-2) Synthesis of 2,3-difluoro-4-ethoxyphenol 122.2 g of 2,3-difluoro-1-ethoxybenzene was dissolved in 1,200 mL of THF and 313.2 mL of butyllithium (2.59 M hexane solution) was added dropwise at −60 to −56° C. over 60 minutes. After stirring at −56 to −60° C. for 2 hours, 88.3 g of trimethyl borate was dissolved in 160 mL of THF and the resulting solution was added dropwise at −50° C. over 45 minutes. After stirring at −60° C. for one hour, the temperature was raised to −5° C. and 120 mL of acetic acid was added. 240 mL of 15% hydrogen peroxide solution was added dropwise over 25 minutes so that the temperature in the system is maintained at 30° C. or lower on a water bath. After stirring for 2 hours at room temperature, the organic layer and the aqueous layer were separated and the aqueous layer was extracted with ethyl acetate. After combining with the organic layer, the mixture was washed in turn with water, an aqueous saturated sodium hydrogen sulfite, water, a saturated sodium hydrogen carbonate solution, water, and saturated saline. The organic layer was dried over anhydrous magnesium sulfate and concentrated to obtain 220 g a reaction mixture was obtained. By silica gel column chromatography (mixed solvent of hexane-ethyl acetate) and recrystallization from the mixed solvent of hexane-ethyl acetate, 116.0 g of 2,3-difluoro-4-ethoxy phenol was obtained.

(1-2) Synthesis of 1-ethoxy-2,3-difluoro-4-(trans-4-vinylcyclohexyl)methoxybenzene (Ia)

[Chemical Formula 35]

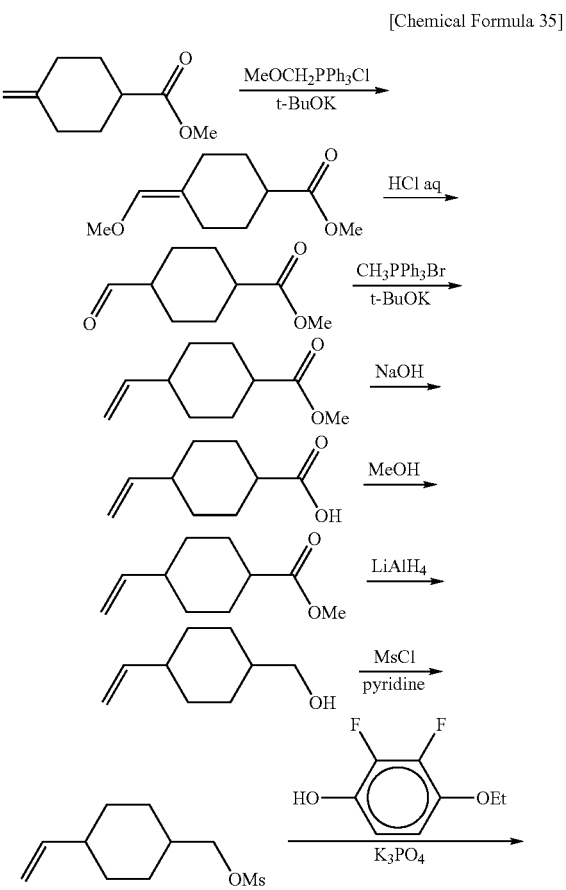

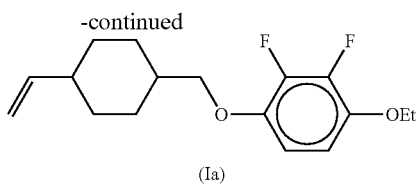

(Ia)

(1-2-1) Synthesis of methyl 4-methoxymethylidenecyclohexanecarboxylate 263.4 g of methoxymethyltriphenylphosphonium chloride was dispersed in 750 mL of tetrahydrofuran (THF) and 86.2 g of potassium-t-butoxide were added at −9 to −4° C. over 5 minutes. After stirring at −4 to −11° C. for 30 minutes, 100.0 g of methyl 4-oxocyclohexanecarboxylate was dissolved in 300 mL of THF and the resulting solution added dropwise at −10 to 4° C. over 80 minutes. After stirring at 0 to 4° C. for 60 minutes, 7.0 g of ammonium chloride and 20 mL of water were added. The solvent of the reaction mixture was distilled off under reduced pressure and 600 mL of hexane was added, followed by stirring at room temperature for 30 minutes. The precipitate was filtrated and the precipitate was suspended and washed again with 600 mL of hexane. After combining with the hexane filtrate, the mixture was washed in turn with a mixed solution of methanol-water (1:1), water, and saturated solution. After dried over anhydrous sodium sulfate, the solvent was distilled off under reduced pressure to obtain 103 g of methyl 4-methoxymethylidenecyclohexanecarboxylate as an oily substance.

(1-2-2) Synthesis of methyl 4-formylcyclohexanecarboxylate 103 g of methyl 4-methoxymethylidenecyclohexanecarboxylate was dissolved in 350 mL of THF and 100 mL of 10% hydrochloric acid was added dropwise at 11 to 13° C. over 10 minutes. After stirring at room temperature for 3 hours, 80 mL of hexane was added. The aqueous layer was extracted with ethyl acetate and then combined with the organic layer, followed by washing in turn with water and saturated saline. The mixture was dried over anhydrous sodium sulfate and concentrated to obtain 92.4 g of methyl 4-formylcyclohexanecarboxylate as an oily substance. The gas chromatography analysis revealed that the resulting substance is a mixture of a cis isomer and a trans isomer in a mixing ratio of 64:36.

(1-2-3) Synthesis of methyl 4-vinylcyclohexanecarboxylate 297.4 g of methoxymethyltriphenylphosphonium bromide was dispersed in 900 mL of tetrahydrofuran (THF) and 95.6 g potassium t-butoxide was added at −8° C. in 3 minutes. After stirring for 30 minutes, all of methyl 4-formylcyclohexanecarboxylate was dissolved in 270 mL of THF and the resulting solution was added dropwise at −6 to 4° C. over 50 minutes. After stirring at 0 to 4° C. for 30 minutes, 15 mL of water was added. The solvent of the reaction mixture was distilled off under reduced pressure and 500 mL of hexane was added, followed by stirring at room temperature for 30 minutes. The precipitate was filtered and the precipitate was suspended and washed again with 500 mL of hexane. After combining with the hexane filtrate, the mixture was washed in turn with a mixed solution of methanol and water (1:1), water, and saturated saline. After drying over anhydrous sodium sulfate, the solvent was distilled off under reduced pressure to obtain 81.2 g of an oily substance. The oily substance was distilled under reduced pressure to obtain 57.3 g of methyl 4-vinylclohexanecarboxylate. A boiling point was 122 to 127° C./48 hPa. The gas chromatography analysis revealed that, the resulting substance is a mixture of a cis isomer and a trans isomer in a mixing ratio of 26:74.

(1-2-4) Synthesis of trans-4-vinylcyclohexanecarboxylic acid 55.3 g of methyl 4-vinylcyclohexanecarboxylate was dissolved in 60 mL of methanol and cooled to 15° C., and then 100 g of 20% sodium hydroxide was added. After stirring at room temperature for 2 hours, concentrated hydrochloric acid was added thereby acidifying the system. After extracting with hexane, the organic layer was washed with saturated saline. The organic layer was dried over anhydrous sodium sulfate and concentrated to obtain 52.4 g of a reaction mixture. The reaction mixture was recrystallized from hexane to obtain 23.0 g of trans-4-vinylcyclohexanecarboxylic acid.

(1-2-5) Synthesis of methyl trans-4-vinylcyclohexanecarboxylate

All of trans-4-vinyl cyclohexane carboxylic acid was dissolved in 120 mL of methanol and 0.1 g of trimethylsilyl chloride was added, followed by refluxing for 6 hours. The solution was cooling to room temperature and then concentrated under reduced pressure. 150 mL of hexane was added and the methanol layer was separated, and then the methanol layer was extracted with hexane. After combining with the organic layer, the mixture was washed with saturated saline. The organic layer was dried over anhydrous sodium sulfate and then concentrated to obtain 29.5 g of methyl trans-4-vinylcyclohexanecarboxylate.

(1-2-6) Synthesis of (trans-4-vinylcyclohexyl)methanol 5.7 g of lithium aluminum hydride was dispersed in 50 mL of THF and all of methyl trans-4-vinylcyclohexanecarboxylate was dissolved in 75 mL of THF and then the resulting solution was added dropwise at 15 to 16° C. over 40 minutes. After stirring at 10 to 20° C. for 30 minutes, water was slowly added. About 70 mL of 10% hydrochloric acid was added and a sludge-like insoluble was removed by decantation, and then the resulting organic layer was washed with in turn with 10% hydrochloric acid, a saturated sodium hydrogen carbonate solution, and saturated saline. The organic layer was dried over anhydrous magnesium sulfate and concentrated to obtain 26 g of (trans-4-vinylcyclohexyl)methanol.

(1-2-7) Synthesis of (trans-4-vinylcyclohexyl)methyl methanesulfonate

All of (trans-4-vinylcyclohexyl)methanol was dissolved in 100 mL of dichloromethane and 23.6 g of pyridine and 0.9 g of 4-dimethyl amino pyridine were added. 18.8 g of methane sulfonyl chloride was dissolved in 36 mL of dichloromethane and the resulting solution was added dropwise at 14 to 20° C. over 25 minutes. After stirring at room temperature for 7 hours, the solution was allowed to stand overnight. 40 mL of water was added and the organic layer was separated, and then, the organic layer was washed in turn with 10% hydrochloric acid, water, a saturated sodium hydrogen carbonate solution, water, and an aqueous saturated ammonium chloride solution. The organic layer was dried over anhydrous magnesium sulfate and concentrated to obtain 32.7 g of a solid substance. The solid substance was recystallized from hexane to obtain 30.8 g of (trans-4-vinylcyclohexyl)methyl methanesulfonate.

(1-2-8) Synthesis of 1-ethoxy-2,3-difluoro-4-(trans-4-vinylcyclohexyl)methox benzene (Ia)

16.1 g of (trans-4-vinylcyclohexyl)methyl methanesulfonate and 14.2 g of 2,3-difluoro-4-ethoxyphenol were dissolved in 100 mL of DMF and 42.4 g of calcium phosphate were added, followed by stirring at 70° C. for 8 hours. After cooling to room temperature, 300 mL of water and 150 mL of toluene were added and then the organic layer and the aqueous layer were separated. The aqueous layer was extracted with toluene. After combining with the organic layer, the mixture was washed in turn with 10% hydrochloric acid, water, a saturated sodium hydrogen carbonate solution, water, and an aqueous saturated ammonium chloride solution. The mixture was dried over anhydrous magnesium sulfate and concentrated to obtain 30.8 g of a reaction mixture. The reaction mixture was subjected to silica gel column chromatography (toluene), distilled under reduced pressure (boiling point: 142 to 144° C./40 Pa) and then recystallized from ethanol to obtain 15.2 g of 1-ethoxy-2,3-difluoro-4-(trans-4-vinylcyclohexyl)methoxybenzene (Ia).

Boiling point: 35.3° C.

MS m/z: 296 (M$^+$), 146 (100)

$^1$H-NMR (400 MHz, CDCl$_3$)

δ: 1.00-1.25 (m, 4H), 1.30-1.45 (m, 3H), 1.70-2.00 (m, 6H), 3.77 (d, J=6.0 Hz, 2H), 4.04 (q, J=7.2 Hz, 2H), 4.88-5.02 (m, 2H), 5.78 (ddd, J=17.2 Hz, J=10.0 Hz, J=6.4 Hz, 1H), 6.57-6.64 (m, 2H)

Example 2

Synthesis of 1-butoxy-2,3-difluoro-4-(trans-4-vinyl-cyclohexyl)methoxybenzene (IIa)

(2-1) Synthesis of 2,3-difluoro-4-butoxyphenol

[Chemical Formula 36]

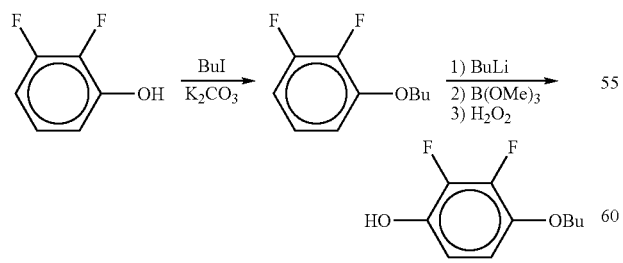

In the same manner as in the synthesis of 2,3-difluoro-4-ethoxyphenol described in Example 1, except that butyl iodide was used instead of ethyl iodide, 2,3-difluoro-4-butoxy phenol was synthesized.

(2-2) Synthesis of 1-butoxy-2,3-difluoro-4-(trans-4-vinylcyclohexyl)methoxybenzene (IIa)

[Chemical Formula 37]

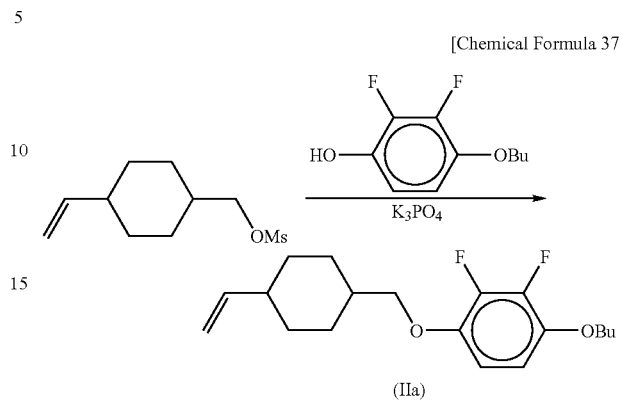

In the synthesis of 1-ethoxy-2,3-difluoro-4-(trans-4-vinylcyclohexyl)methoxybenzene, the same reaction was conducted, except that 2,3-difluoro-4-butoxyphenol was used instead of 2,3-difluoro-4-ethoxy phenol, to obtain 1-butoxy-2,3-difluoro-4-(trans-4-vinylcyclohexyl)methoxybenzene (IIa), as a colorless oily substance.

MS m/z: 324 (M$^+$), 146 (100)

$^1$H-NMR (400 MHz, CDCl$_3$)

δ: 0.97 (t, J=7.2 Hz, 3H), 1.00-1.25 (m, 4H), 1.40-1.55 (m, 2H), 1.70-2.00 (m, 8H), 3.78 (d, J=6.4 Hz, 2H), 3.98 (t, J=6.4 Hz, 2H), 4.88-5.02 (m, 2H), 5.79 (ddd, J=17.6 Hz, J=10.4 Hz, J=6.4 Hz, 1H), 6.55-6.65 (m, 2H)

Example 3

Synthesis of 4-ethoxy-2,3-difluoro-1-(trans-4-(trans-4-vinylcyclohexyl)cyclohexyl)methoxy benzene (IIIa)

[Chemical Formula 38]

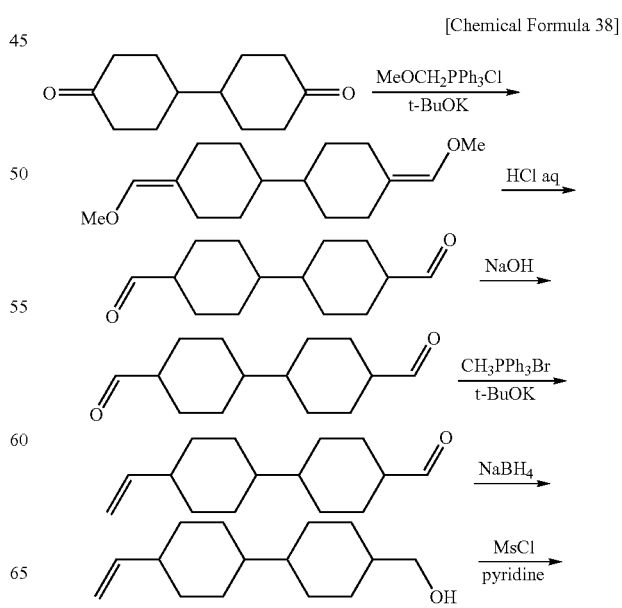

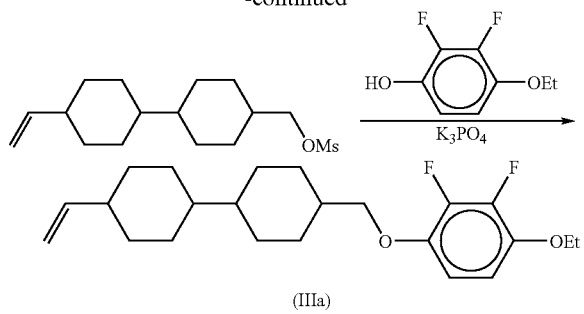

(IIIa)

(3-1) Synthesis of 4,4'-bis(methoxymethylidene)bicyclohexyl 882.3 g of methoxymethyltriphenylphosphonium chloride was dispersed in 2,600 mL of THF, followed by cooling to −10° C. 313.2 g of potassium-t-butoxide were added while maintaining the inner temperature. After stirring or one hours, a THF (800 mL) solution of 200.0 g of bicyclohexyl-4,4'-dione was and added dropwise. After stirring for 1 hour while maintaining the inner temperature, water was added thereby terminating the reaction. The solvent was distilled off under reduced pressure and hexane was added, followed by stirring and vigorous stirring and further filtration (twice). The filtrates were combined, washed in turn with an aqueous 50% methanol solution and saturated saline, and then dried over anhydrous magnesium sulfate. The solvent was distilled off to obtain 231.8 g of a white solid.

(3-2) Synthesis of trans,trans-bicyclohexyl-4,4'-dicarbaldehyde 700 mL of 10% hydrochloric acid was added to a THF (930 mL) solution of 231.8 g of the solid obtained in (3-1), followed by heating at reflux for one hour. The reacted solution was air-cooled and the organic layer was separated, followed by extraction with toluene (4 times) from the aqueous solution. A combined organic layer was washed with saturated saline and dried over anhydrous magnesium sulfate. The solvent was distilled off to obtain 204.5 g of a reddish brown liquid. The resulting liquid was dissolved in 800 mL of methanol. Under stirring vigorously at −10° C., 80 mL of an aqueous 10% sodium hydrate was added dropwise while maintaining the inner temperature. After stirring for 2 hours while maintaining the inner temperature, water was added and the precipitated solid was collected by suction filtration. The resulting solid was washed in turn with water and methanol and then dried to obtain 189.4 g of a white solid.

(3-3) Synthesis of 4'-vinylbicyclohexyl-4-carbaldehyde 192.5 g of methoxymethyltriphenylphosphonium bromide was dispersed in 580 mL of THF. While maintaining the inner temperature, 66.6 g potassium t-butoxide was added dropwise under vigorous stirring at −10° C. While maintaining the inner temperature, the solution was added dropwise at the inner temperature of 5 to 10° C. in a THF (1,800 mL) solution of 120.0 g of the solid obtained by (3-2). After stirring for one hour while maintaining the inner temperature, water was added thereby terminating the reaction. The reaction solution was washed with an aqueous 5% ammonium chloride solution. The solvent of the organic layer was distilled off. Hexane and toluene were added, followed by washing with 50% methanol water. After drying over anhydrous magnesium sulfate, the solvent was distilled off under reduced pressure to obtain 60.1 g of a nearly colorless solid.

(3-4) Synthesis of trans-4-(trans-4-vinylcyclohexyl)cyclohexylmethanol

A THF (180 mL) solution of 60.1 g of a nearly colorless solid obtained in (3-3) was added dropwise in an ethanol (120 mL) solution of 1.65 g of sodium borohydride under stirring at −10° C. while stirring the inner temperature. After raising the temperature to room temperature and stirring for 2 hours, water, ethyl acetate and an aqueous ammonium chloride aqueous were added, thereby terminating the reaction. The saturated saline was added to the reacted solution, and the organic layer was separated, and then the aqueous layer was extracted with ethyl acetate (twice). The combined organic layer was washed with saturated saline and dried over anhydrous magnesium sulfate. The solvent was distilled off under reduced pressure and the residue was purified by column chromatography to obtain 15.4 g of trans-4-(trans-4-vinylcyclohexyl)cyclohexylmethanol as a white solid.

(3-5) Synthesis of trans-4-(trans-4-vinylcyclohexyl)cyclohexylmethyl methanesulfonate 15.1 g of trans-4-(trans-4-vinylcyclohexyl)cyclohexylmethanol, 8.2 mL of pyridine, and 0.41 g of 4-dimethylaminopyridine were dissolved in 50 mL of dichloromethane. Under ice cooling, a dichloromethane (6 mL) solution was added dropwise over 30 minutes. After raising the temperature to room temperature and stirring for 6 hours, the solution was allowed to stand overnight. The reacted solution was poured into 10% hydrochloric acid and the organic layer was separated, and the aqueous layer was extracted with dichloromethane. After combining with the organic layer, the mixed layer was washed with saturated saline and then dried over anhydrous magnesium sulfate. The solvent was distilled off and the residue was purified by column chromatography (silica gel/toluene) and recrystallization (hexane/toluene) three times to obtain 9.8 g of trans-4-(trans-4-vinylcyclohexyl)cyclohexylmethyl methanesulfonate as a colorless crystal.

(3-6) Synthesis of 4-ethoxy-2,3-difluoro-1-(trans-4-(trans-4-vinylcyclohexyl)cyclohexyl)methoxybenzene (IIIa)

9.8 g of trans-4-(trans-4-vinylcyclohexyl)cyclohexylmethyl methanesulfonate and 5.96 g of 2,3-difluoro-4-ethoxyphenol were dissolved in 90 mL of DMF. 10.4 g of tripotassium phosphate was added, followed by stirring at 90 to 100° C. for 3 hours. The reaction mixture was poured into water, extracted with toluene, washed in turn with water, 10% hydrochloric acid, water, and saturated saline and then dried over anhydrous sodium sulfate. The solvent was distilled off under reduced pressure and the residue was purified in turn by subjecting to column chromatography (silica gel/toluene), recrystallization (methanol/acetone), column chromatography (alumina/acetone), washing with ion-exchange water, silica treatment, and recrystallization (methanol/acetone) to obtain 8.5 g of 4-ethoxy-2,3-difluoro-1-(trans-4-(trans-4-vinylcyclohexyl)cyclohexyl)methoxybenzene (IIIa) as a colorless crystal.

Phase transition temperature C 61 N 141 I
(Phase transition temperature of Solid-Nematic: 61° C.
Phase transition temperature of Nematic-Isotropic liquid: 141° C.)

MS m/z: 378 (M+), 174 (100)

$^1$H-NMR (400 MHz, CDCl$_3$)

δ: 0.95-1.15 (m, 10H), 1.41 (t, J=6.8 Hz, 3H), 1.65-2.00 (m, 10H), 3.76 (d, J=6.3 Hz, 2H), 4.05 (q, J=6.8 Hz, 2H), 4.80-5.00 (m, 2H), 5.77 (ddd, J=17.3 Hz, J=10.2 Hz, J=6.3 Hz, 1H), 6.60 (d, J=4.9 Hz, 2H)

Example 4

Synthesis of 4-butoxy-2,3-difluoro-1-(trans-4-(trans-4-vinylcyclohexyl)methoxybenzene (IVa)

[Chemical Formula 39]

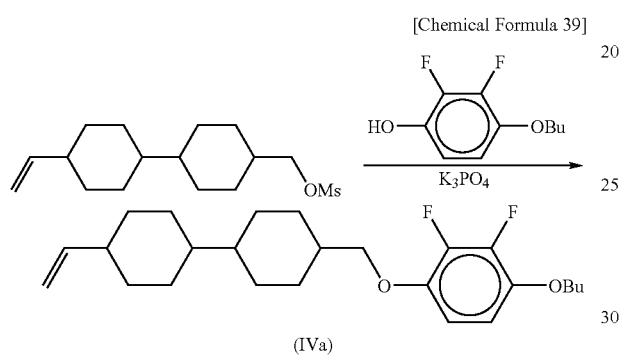

(IVa)

In the synthesis of 4-ethoxy-2,3-difluoro-1-(trans-4-(trans-4-vinylcyclohexyl)cyclohexyl)methoxybenzene (IIIa), the same reaction was conducted, except that 2,3-difluoro-4-butoxyphenol was used instead of 2,3-difluoro-4-ethoxyphenol, to obtain 4-butoxy-2,3-difluoro-1-(trans-4-(trans-4-vinylcyclohexyl)methoxybenzene (IVa).

Phase transition temperature C, 65.4; N, 129.9. I
(Phase transition temperature of solid-nematic: 65.4° C.
Phase transition temperature of nematic-isotropic liquid: 129.9° C.)

MS m/z: 406 (M+), 146 (100)

$^1$H-NMR (400 MHz, CDCl$_3$)

δ: 0.90-1.15 (m, 10H), 0.97 (t, J=7.6 Hz, 3H), 1.40-1.55 (m, 2H), 1.65-2.00 (m, 12H), 3.76 (d, J=6.4 Hz, 2H), 3.98 (t, J=6.8 Hz, 2H), 4.80-5.00 (m, 2H), 5.77 (ddd, J=17.6 Hz, J=10.0 Hz, J=6.4 Hz, 1H), 6.26-6.66 (m, 2H)

Example 5

In Example 5, a liquid crystal composition (No. 1) represented by the following skeleton was prepared using the compounds prepared in Examples 1 and 2 and then physical properties were measured.

[Chemical Formula 40]

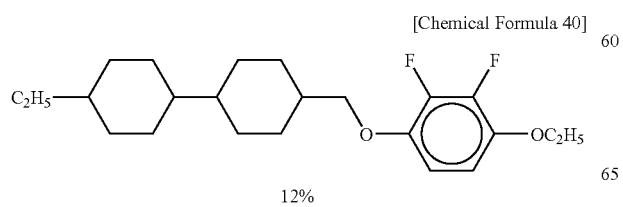

12%

-continued

17%

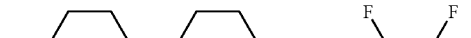

10%

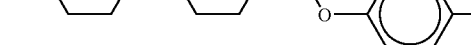

8%

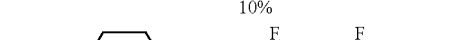

13%

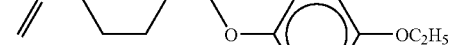

15%

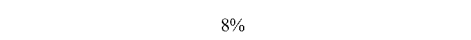

15%

10%

Example 5 is characterized by using only a compound having an alkyl group as a side chain in the general formula (II), and characteristics are as follows: Tni: 79.8° C., Δn: 0.073, Δ∈: −4.7, and η: 20.3 mPa·s Comparative Example 1

In Comparative Example 1, a liquid crystal composition (R-1) represented by the following structure, which has the composition similar to Example 1 and does not contain a compound represented by the general formula (I), was prepared and then physical properties were measured.

[Chemical Formula 41]

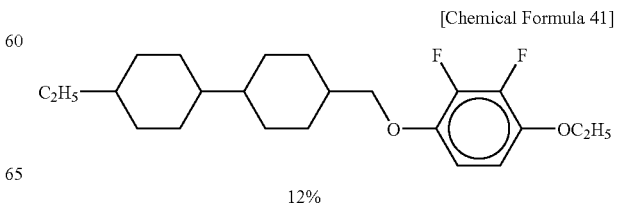

12%

29

-continued

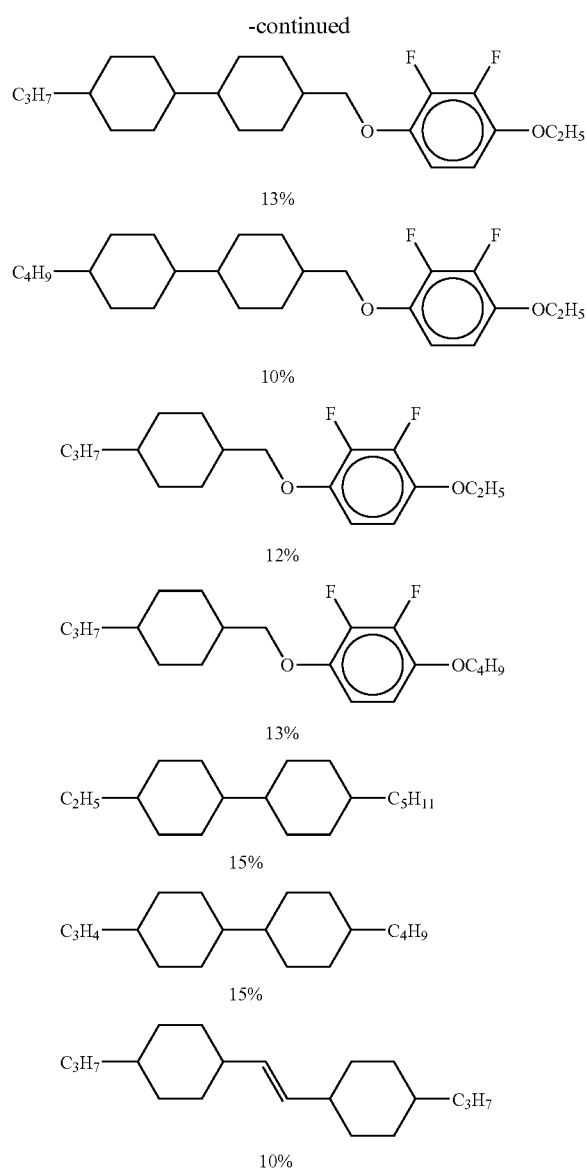

Characteristics of R-1 are as follows: Tni: 80.0° C., Δn: 0.073, Δ∈: −4.8, and η: 23.0 mPa·s.

These characteristics were summarized in Table 1

TABLE 1

Example 5 and Comparative Example 1

|  | No. 1 | R-1 |
| --- | --- | --- |
| (I) (%) | 21 | — |
| (II) (%) | 40 | 40 |
| (III) (%) | 39 | 60 |
| $T_{ni}$ (° C.) | 79.8 | 80.0 |
| Δn | 0.073 | 0.073 |
| Δε | −4.7 | −4.8 |
| η (mPa · s) | 20.3 | 23.0 |

As is apparent from Table 1, R-1 has nearly the same Tni, Δn, and dielectric anisotropy to those of No. 1, but has considerably high viscosity.

30

In the table, (III) denotes compounds represented by the general formulas (III-A) to (III-J). This is to be repeated in the following tables.

Example 6

A liquid crystal composition (No. 2) represented by the following structure was prepared and then physical properties were measured.

[Chemical Formula 42]

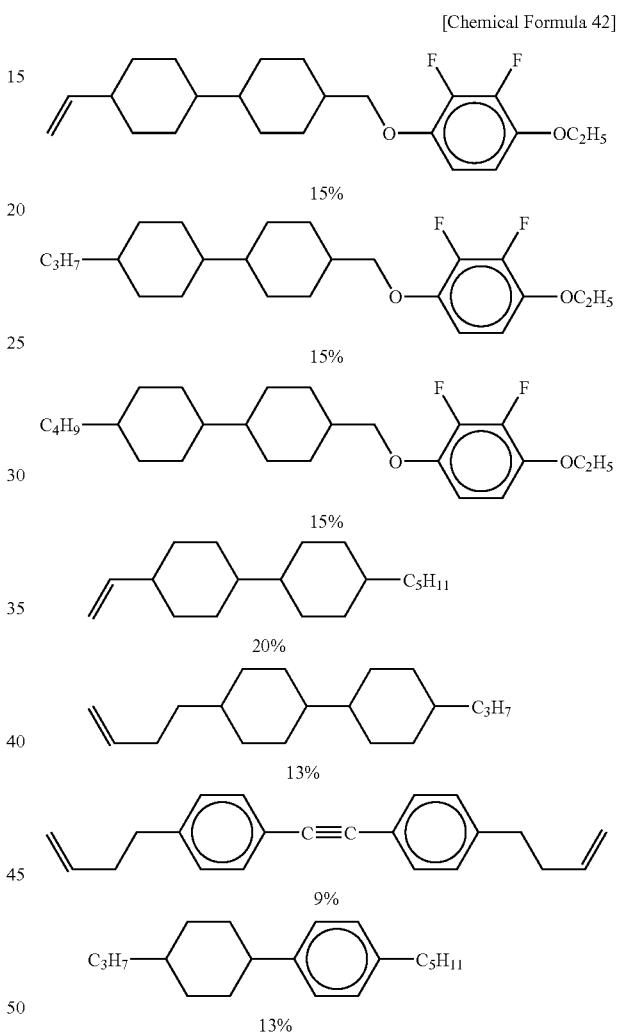

No. 2 is a liquid crystal composition having slightly larger Δn than that of No. 1 described in Example 5, and characteristics are as follows: Tni: 90.8° C., Δn: 0.096, Δ∈: −3.0, and η: 17.0 mPa·s.

Comparative Example 2

In Comparative Example 2, a liquid crystal composition (R-2) represented by the following structure, which has nearly the same composition with respect to a compound represented by the general formula (II) and does not contain a compound represented by the general formula (I), was prepared and then physical properties were measured.

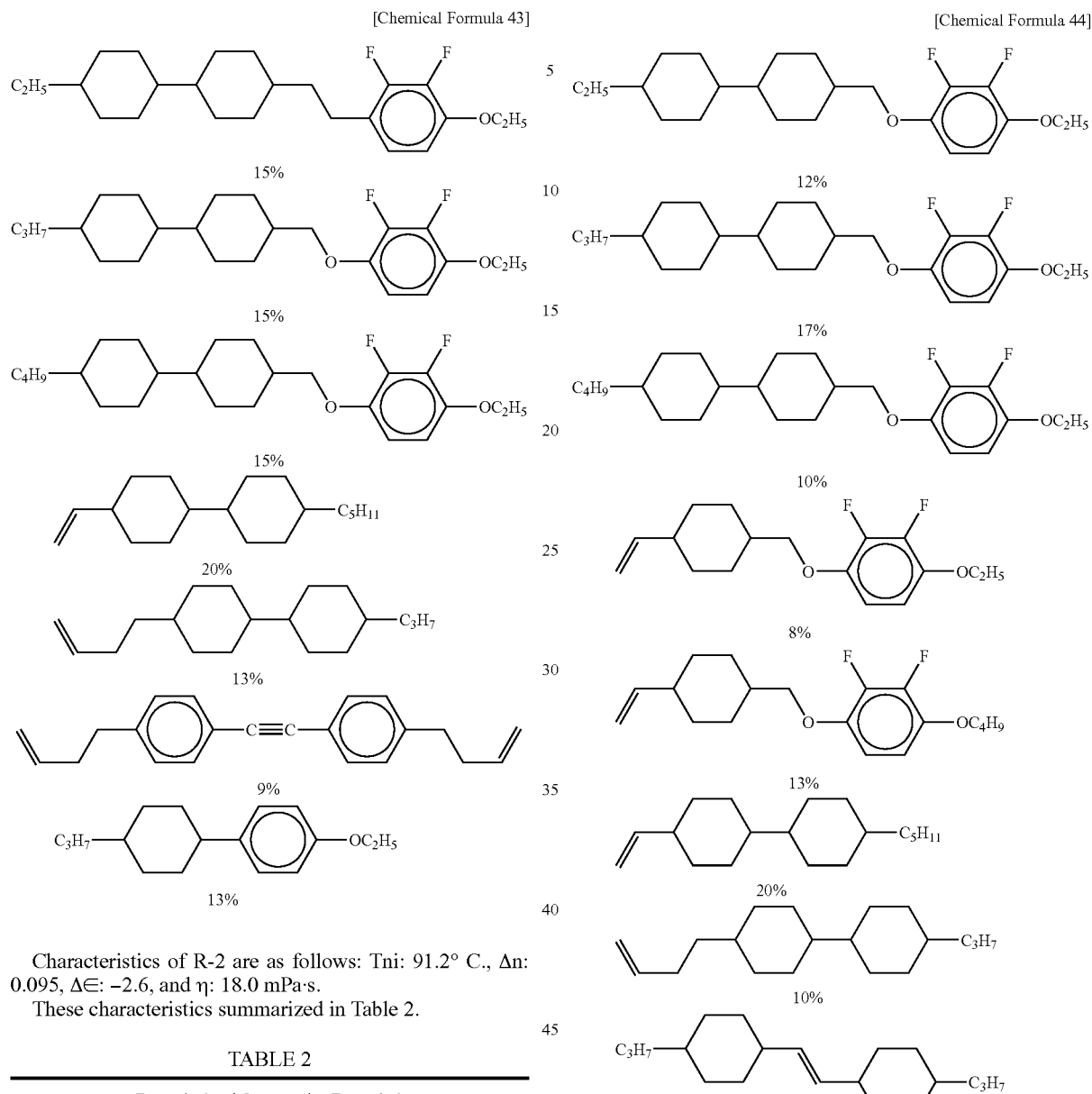

Characteristics of R-2 are as follows: Tni: 91.2° C., Δn: 0.095, Δ∈: −2.6, and η: 18.0 mPa·s.

These characteristics summarized in Table 2.

TABLE 2

Example 6 and Comparative Example 2

|  | No. 2 | R-2 |
|---|---|---|
| (I) (%) | 15 | — |
| (II) (%) | 55 | 55 |
| (III) (%) | 30 | 45 |
| $T_{ni}$ (° C.) | 90.8 | 91.2 |
| Δn | 0.096 | 0.095 |
| Δε | −3.0 | −2.6 |
| η (mPa · s) | 17.0 | 18.0 |

As is apparent from Table 2, No. 2 is a liquid crystal composition which has nearly the same Tni and Δn to those of R-2, but has a negative Δ∈ whose absolute value is larger, and also has a lower viscosity than that of R-2

Examples 7 and 8

The liquid crystal composition (No. 3) represented by the following structure was prepared and physical properties were measured.

Characteristics of No. 3 are as follows: Tni: 78.9° C., Δn: 0.074, Δ∈: −4.7, and η: 18.5 mPa·s.

A liquid crystal composition (No. 4) represented by the following structure was prepared and then physical properties were measured.

[Chemical Formula 45]

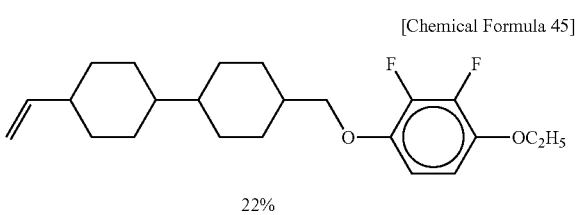

22%

-continued

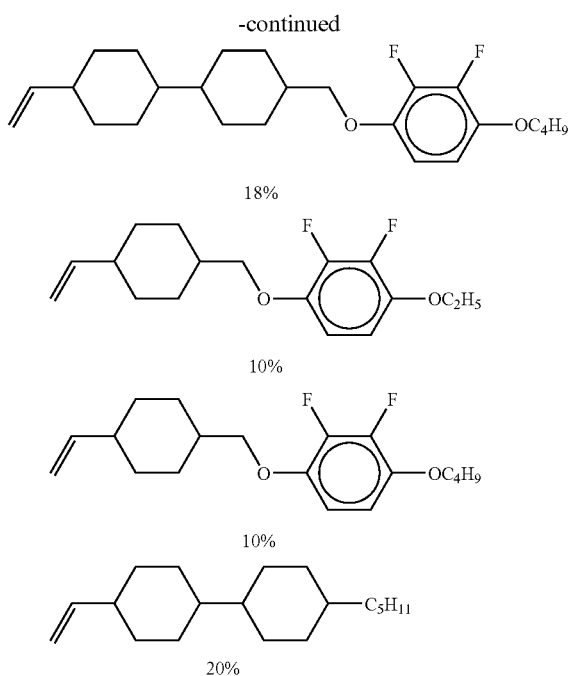

Characteristics of No. 4 are as follows: Tni: 76.4° C., Δn: 0.076, Δ∈: −4.6, and η: 17.6 mPa·s.

Using compounds having an alkenyl side chain in a compound represented by the general formula (II), No. 3 and No. 4 have both of the particularly high absolute value of Δ∈ and the low viscosity.

Comparative Examples 3, 4, 5, and 6

In Comparative Example 3, a liquid crystal composition (R-3) represented by the following structure, which does not contain a compound represented by the general formula (I) was prepared and then physical properties were measured.

[Chemical Formula 46]

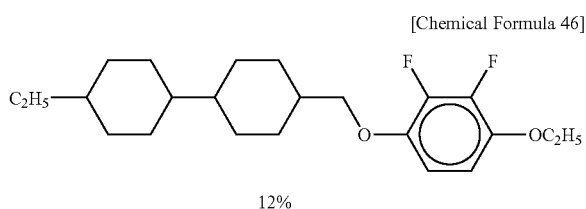

-continued

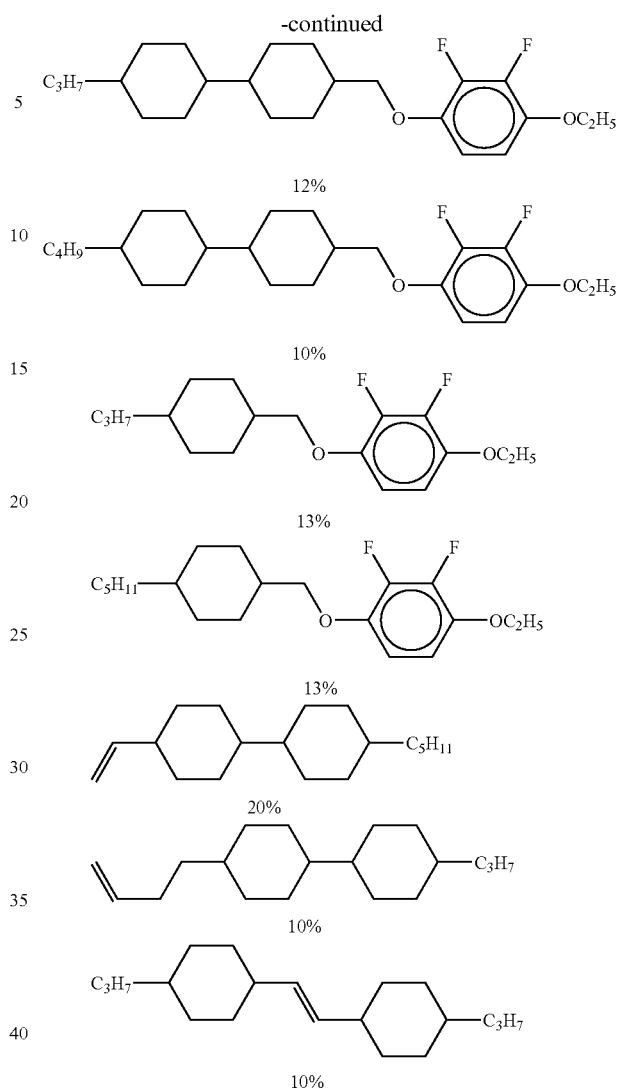

Characteristics of R-3 are as follows: Tni: 76.3° C., Δn: 0.074, Δ∈: −4.8, and η: 20.0 mPa·s.

In Comparative Example 4, a liquid crystal composition (R-4) represented by the following structure containing a small amount of a compound represented by the general formula (I) was prepared and then physical properties were measured.

[Chemical Formula 47]

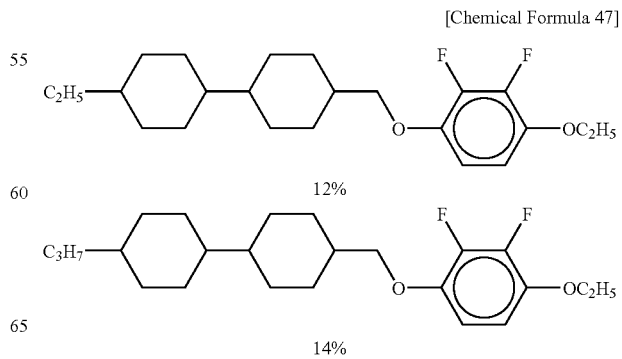

-continued

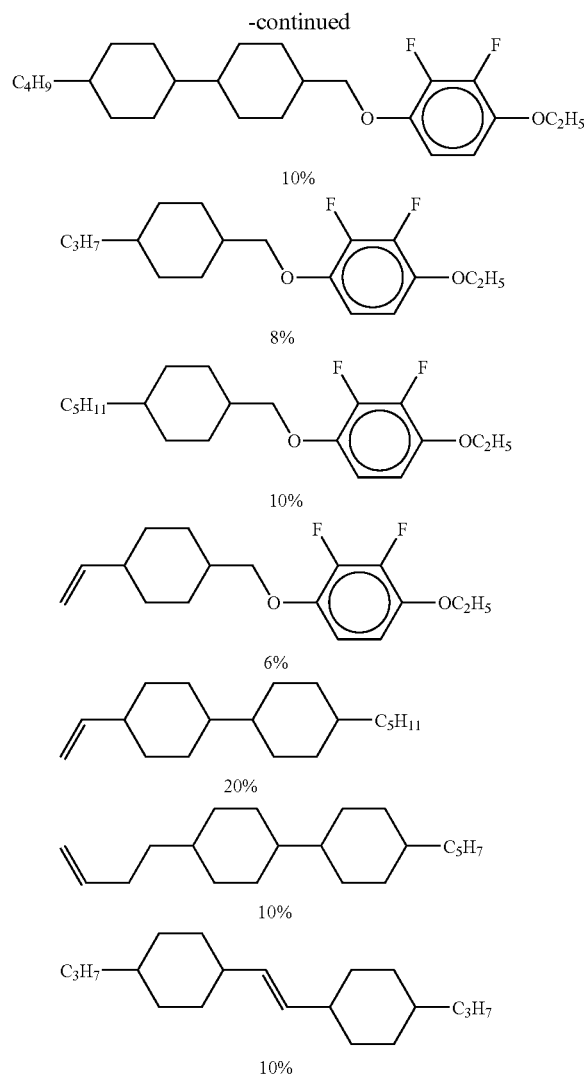

Characteristics of R-4 are as follows: Tni: 76.5° C., Δn: 0.074, Δ∈: −4.8, and η: 20.2 mPa·s.

In Comparative Example 5, a liquid crystal composition (R-5) represented by the following structure, which does not contain a compound represented by the general formula (I), was prepared and then physical properties were measured.

[Chemical Formula 48]

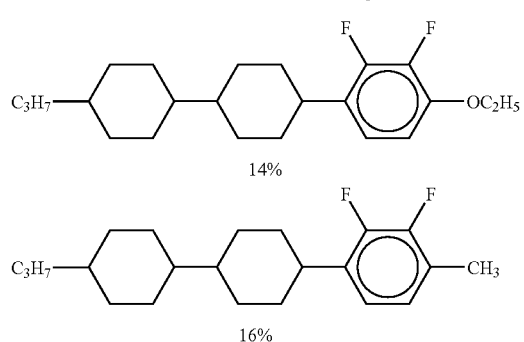

-continued

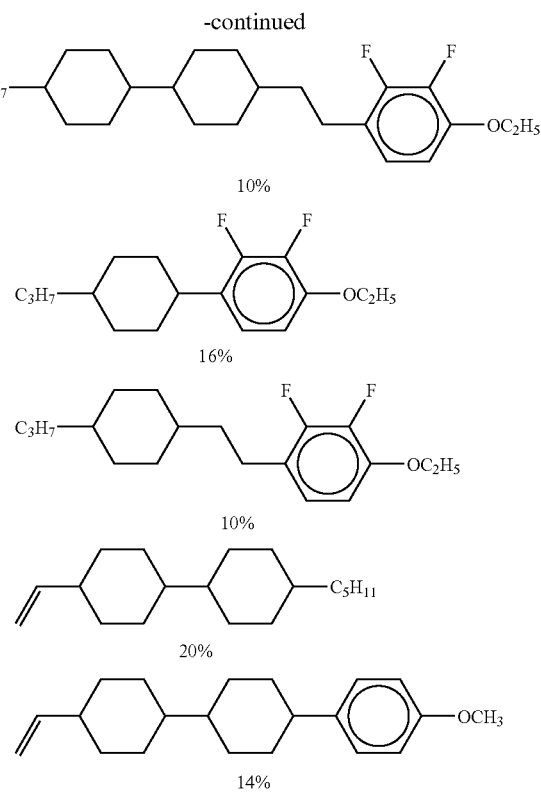

Characteristics of R-5 are as follows: Tni: 82.0° C., Δn: 0.082, Δ∈: −2.5, and η: 22.3 mPa·s.

In Comparative Example 6, a liquid crystal composition (R-6) represented by the following structure, which does not contain a compound represented by the general formula (I), was prepared and then physical properties were measured.

[Chemical Formula 49]

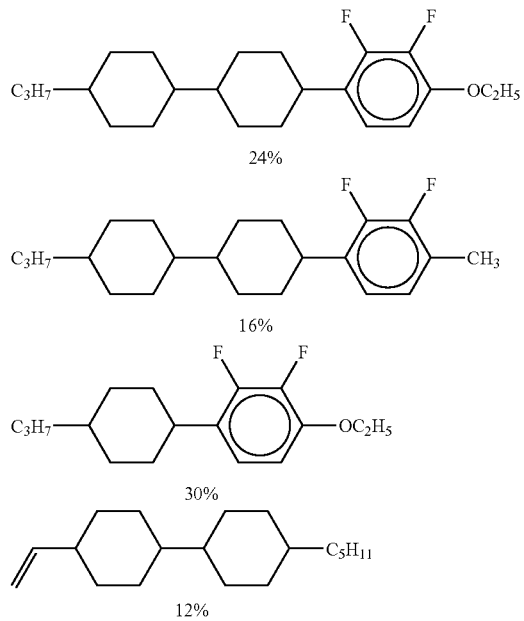

-continued

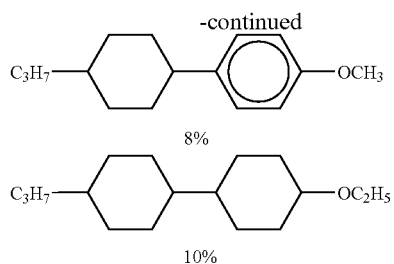

8%

10%

Characteristics of R-6 are as follows: Tni: 49.5° C., Δn: 0.076, Δ∈: −3.0, and η: 23.1 mPa·s.

These characteristics are summarized in Table 3.

TABLE 3

Examples 7 and 8, and Comparative Examples 3, 4, 5 and 6

|  | No. 3 | No. 4 | R-3 | R-4 | R-5 | R-6 |
|---|---|---|---|---|---|---|
| (I) (%) | 21 | 60 | — | 6 | — | — |
| (II) (%) | 40 | 40 | 40 | 40 | 34 | 30 |
| (III) (%) | 39 | — | 60 | 54 | 66 | 70 |
| $T_{ni}$ (° C.) | 79.8 | 76.4 | 76.3 | 76.5 | 82.0 | 49.5 |
| Δn | 0.074 | 0.076 | 0.074 | 0.074 | 0.082 | 0.076 |
| Δε | −4.7 | −4.6 | −4.8 | −4.8 | −2.5 | −3.0 |
| η (mPa · s) | 18.5 | 17.6 | 20.0 | 20.2 | 22.3 | 23.1 |

As is apparent from Table 3, by comparing No. 3 with R-3, R-3 has a higher viscosity and a slightly lower Tni. R-3 is characterized by using a compound whose alkenyl side chain in the general formula (I) is substituted with an alkyl side chain. R-4 has a composition in which a compound having an alkyl side chain in R-3 is partially substituted with the general formula (I) having an alkenyl side chain. However, the substitution amount is 6%, which is small and out of the scope of the invention of the present application. R-4 entirely has the same properties as those of R-3, and when compared to No. 3, the viscosity is high and Tni is slightly low.

On the other hand, R-5, which is well used in producing liquid crystal display device, is a liquid crystal composition composed mainly of a compound having a negative Δε with no coupling group. R-5 has a small absolute value of Δε but a high viscosity. R-6 is a liquid crystal composition composed mainly of a compound having a negative Δε with no coupling group and the general formula (II) having an alkyl group. However, R-6 has drastically decreased Tni, in addition to the disadvantage of R-5.

Example 9

A liquid crystal composition (No. 5) represented by the following structure was prepared and then physical properties were measured.

[Chemical Formula 50]

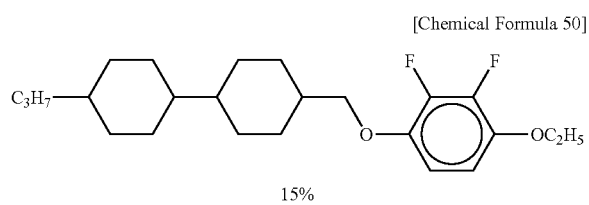

15%

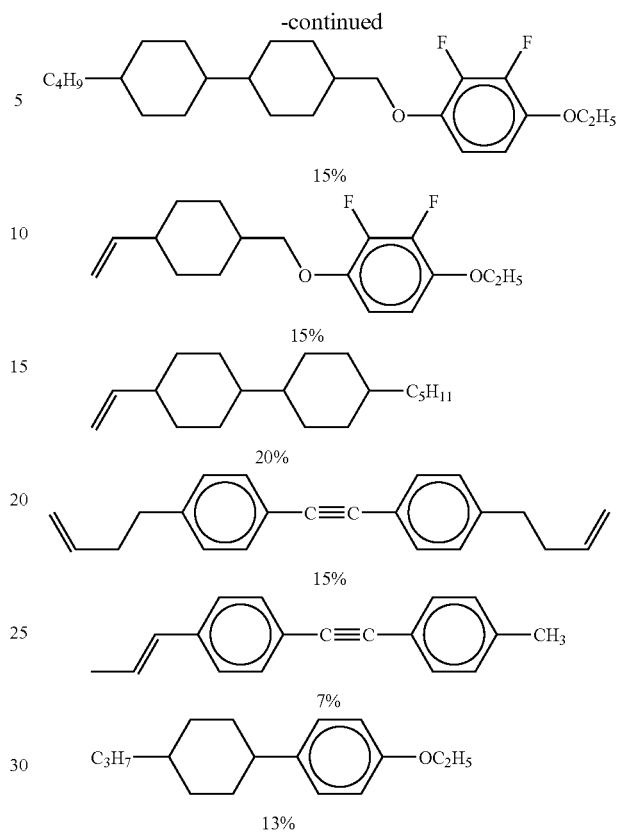

No. 5 is a liquid crystal composition having a large Δn, and characteristics are as follows: Tni: 91.2° C., Δn: 0.122, Δε: −3.0, and η: 19.0 mPa·s.

Comparative Example 7

In Comparative Example 7, a liquid crystal composition (R-7) represented by the following structure, which does not contain a compound represented by the general formula (I), was prepared and then physical properties were measured.

[Chemical Formula 51]

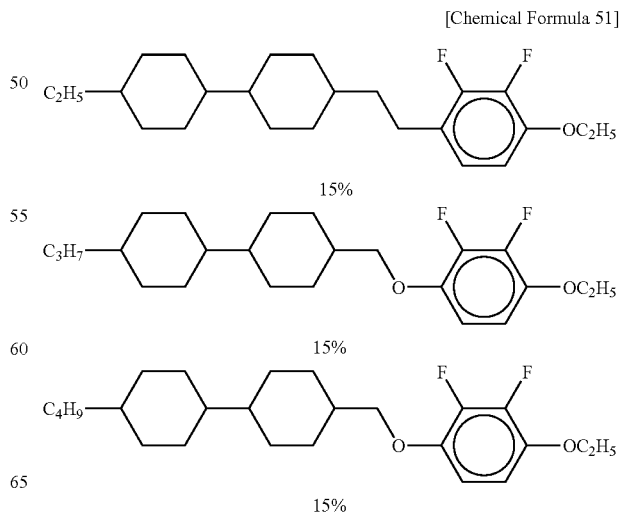

-continued

C$_2$H$_5$—[Cy]—[Cy]—C$_5$H$_{11}$

7%

C$_3$H$_7$—[Cy]—[Cy]—C$_4$H$_9$

13%

C$_4$H$_9$—[Ph]—C≡C—[Ph]—OC$_2$H$_5$

7%

C$_5$H$_{11}$—[Ph]—C≡C—[Ph]—OCH$_3$

6%

C$_3$H$_7$—[Ph]—C≡C—[Ph]—CH$_3$

9%

C$_3$H$_7$—[Cy]—[Ph]—OC$_2$H$_5$

13%

Characteristics of R-7 are as follows: Tni: 91.2° C., Δn: 0.123, Δ∈: −2.6, and η: 23.6 mPa·s.

These characteristics are summarized in Table 4.

TABLE 4

| Example 9 and Comparative Example 17 | | |
|---|---|---|
| | No. 5 | R-7 |
| (I) (%) | 15 | — |
| (II) (%) | 55 | 55 |
| (III) (%) | 30 | 45 |
| T$_{ni}$ (° C.) | 91.2 | 91.2 |
| Δn | 0.122 | 0.123 |
| Δε | −3.0 | −2.6 |
| η (mPa · s) | 19.0 | 23.6 |

As is apparent from Table 4, these liquid crystal compositions are characterized by having a large Δn and relatively high Tni, and No. 5 and R-7 have the same Tni and Δn. However, in R-7, as a result of setting the Tni and the Δn to be equal, the absolute value of Δ∈ is low and the viscosity is drastically high.

Examples 10, 11, and 12

A liquid crystal composition (No. 6), a liquid crystal composition (No. 7) and a liquid crystal composition (No. 8) represented by the following structures were prepared and then physical properties were measured.

[Chemical Formula 52]

CH$_2$=CH—[Cy]—[Cy]—CH$_2$—O—[Ph(F,F)]—OC$_2$H$_5$

12%

CH$_2$=CH—CH=CH—[Cy]—[Cy]—CH$_2$—O—[Ph(F,F)]—OC$_2$H$_5$

12%

CH$_2$=CH—CH$_2$—[Cy]—[Cy]—CH$_2$—O—[Ph(F,F)]—OC$_2$H$_5$

10%

C$_3$H$_7$—[Cy]—CH$_2$—O—[Ph(F,F)]—OC$_2$H$_5$

13%

C$_5$H$_{11}$—[Cy]—CH$_2$—O—[Ph(F,F)]—OC$_2$H$_5$

13%

CH$_2$=CH—[Cy]—[Cy]—C$_5$H$_{11}$

20%

CH$_2$=CH—CH$_2$—[Cy]—[Cy]—C$_3$H$_7$

10%

C$_3$H$_7$—[Cy]—CH=CH—[Cy]—C$_3$H$_7$

10%

Characteristics of No. 6 as follows: Tni: 77.7° C., Δn: 0.075, Δ∈: −4.6, and η: 18.8 mPa·s.

[Chemical Formula 53]

CH$_2$=CH—[Cy]—[Cy]—CH$_2$—O—[Ph(F,F)]—OC$_2$H$_5$

12%

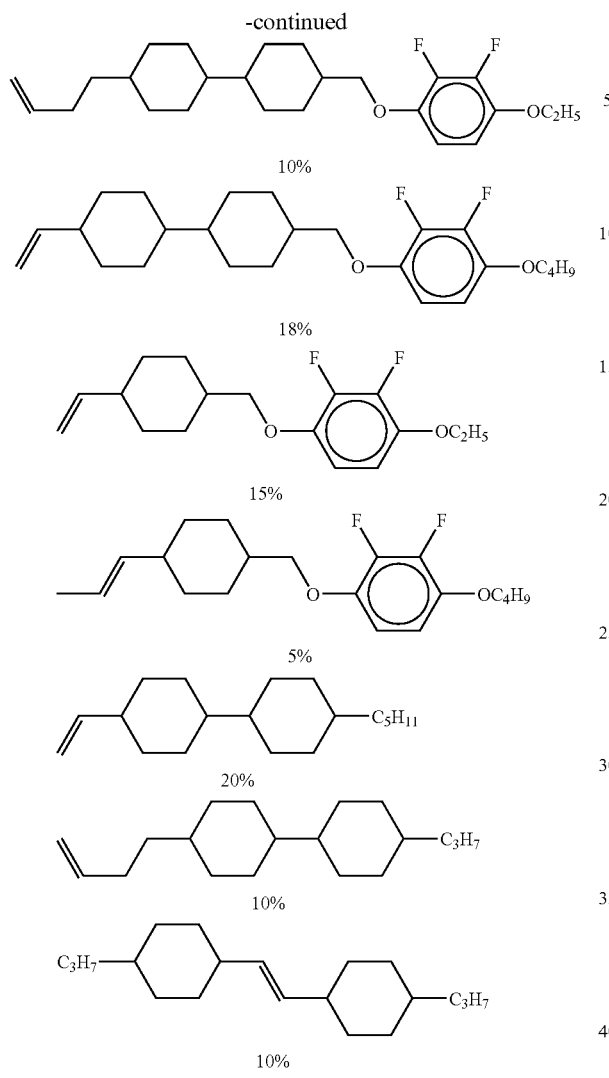

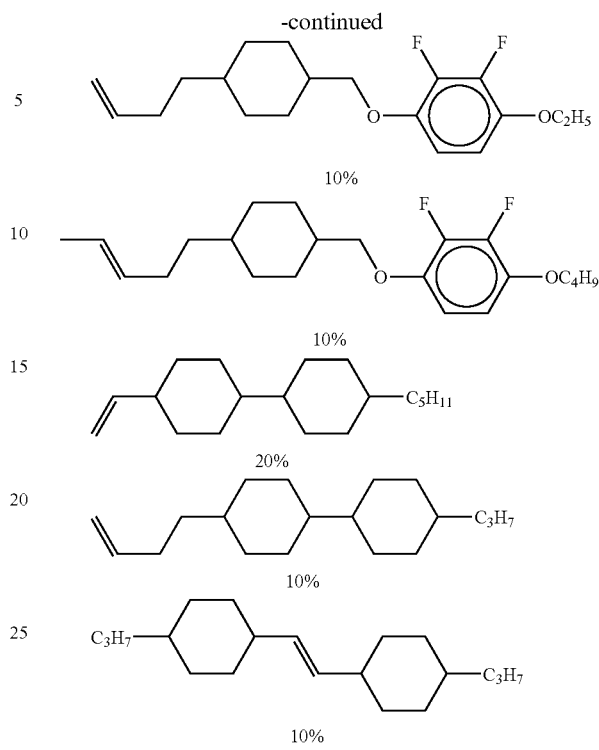

Characteristics of No. 7 are as follows: Tni: 80.9° C., Δn: 0.077, Δ∈: −4.5, and η: 18.6 mPa·s.

[Chemical Formula 54]

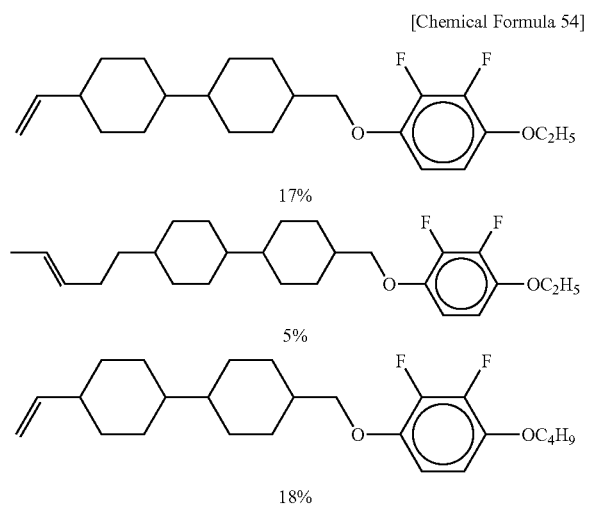

Characteristics of No. 8 are as follows: Tni: 84.2° C., Δn: 0.079, Δ∈: −4.4, and η: 19.3 mPa·s.

These physical properties are summarized in Table 5.

TABLE 5

| | Example 10, 11 and 12 | | |
|---|---|---|---|
| | No. 6 | No. 7 | No. 8 |
| (I) (%) | 34 | 60 | 60 |
| (II) (%) | 40 | 40 | 40 |
| (III) (%) | 26 | — | — |
| $T_{ni}$ (° C.) | 77.7 | 80.9 | 84.2 |
| Δn | 0.075 | 0.077 | 0.079 |
| Δε | −4.6 | −4.5 | −4.4 |
| η (mPa · s) | 18.8 | 18.6 | 19.3 |

It is apparent that a liquid crystal composition is composed mainly of a compound having an alkenyl side chain and has both the large Δ∈ and the low viscosity.

Using these liquid crystal compositions, a VA-type liquid crystal display apparatus having excellent display integrity could be produced.

INDUSTRIAL APPLICABILITY

The liquid composition of the present invention is very practical as a constituent member of a liquid crystal display for VA system, ECB system or IPS system.

The invention claimed is:

1. A nematic liquid crystal composition having a negative dielectric anisotropy, comprising:
one, or two or more compounds represented by the general formula (I):

[Chemical Formula 1]

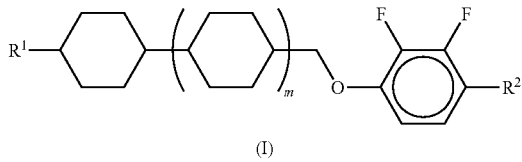

(I)

wherein $R^1$ represents an alkenyl group having 2 to 10 carbon atoms, and one $CH_2$ group or two or more unadjacent $CH_2$ groups existing in the groups may be substituted with O and/or S, and one, or two or more hydrogen atoms existing in these groups may be substituted with F or Cl; and $R^2$ represents an alkyl group having 1 to 10 carbon atoms or an alkoxyl group having 1 to 10 carbon atoms; and m represents 0, 1, or 2) as a first component, the content of which is from 10 to 80% by weight; and one, or two or more compounds represented by the general formula (II):

[Chemical Formula 2]

wherein $R^3$ and $R^4$ each independently represents an alkyl group having 1 to 10 carbon atoms, an alkenyl group having 2 to 10 carbon atoms, an alkoxyl group having 1 to 10 carbon atoms, or an alkenyloxy group having 3 to 10 carbon atoms; $B^1$ and $B^2$ each independently represents a group selected from the group consisting of:

(a) a trans-1,4-cyclohexylene group (one $CH_2$ group or two unadjacent $CH_2$ groups existing in the group may be substituted with an oxygen atoms or a sulfur atom), (b) a 1,4-phenylene group (one, or two or more CH groups existing in the group may be substituted with a nitrogen atom), (c) a cyclohexan-1,4-diyl, a bicyclo[2.2.2]octan-1,4-dily group, a piperidin-1,4-diyl group, a naphthalen-2,6-diyl group, a decahydronaphthalen-2,6-diyl group, and a 1,2,3,4-tetrahydronaphthalen-2,6-diyl group, and the group (a), the group (b), or the group (c) may be substituted with CN or halogen;

$Y^1$ and $Y^2$ each independently represents —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —C≡C—, —$CF_2O$—, —$OCF_2$—, —COO—, —OCO—, —COS—, —SCO—, or a single bond, and when a plurality of $Y^2$ or $B^2$ exist, they may be same or different; and P represents 0, 1, or 2 as a second component, the content of which is from 20 to 70% by weight.

2. The nematic liquid crystal composition according to claim 1, wherein at least one of $R^3$ and $R^4$ represents an alkenyl group having 2 to 10 carbon atoms in the general formula (II).

3. The nematic liquid crystal composition according to claim 1, comprising one, or two or more compounds selected from the group consisting of compounds represented by general formulas (I-A) and (I-B):

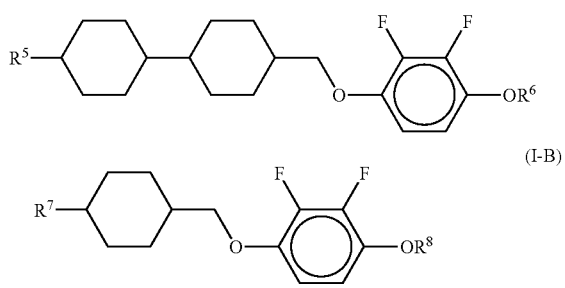

wherein $R^5$ and $R^7$ each independently represents the same meaning as $R^1$ in the general formula (I), and $R^6$ and $R^8$ each independently represents an alkyl group having 1 to 10 carbon atoms or an alkenyl group having 2 to 10 carbon atoms.

4. The nematic liquid crystal composition according to claim 1, comprising one, or two or more compounds selected from the group consisting of compounds represented by general formulas (II-A) to (II-G):

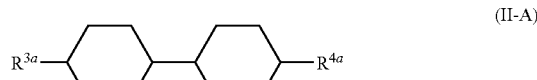

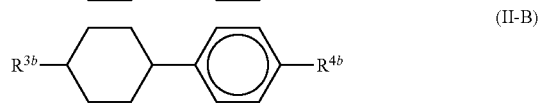

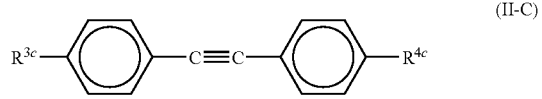

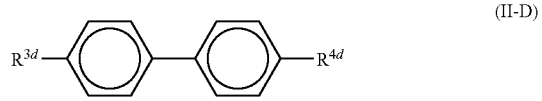

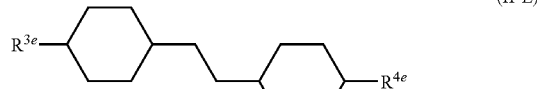

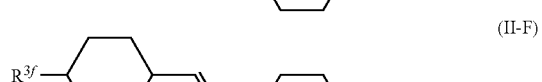

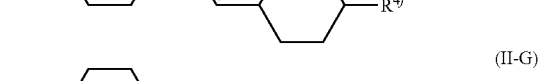

wherein $R^{3a}$, $R^{3b}$, $R^{3c}$, $R^{3d}$, $R^{3e}$, $R^{3f}$, $R^{3g}$, $R^{4a}$, $R^{4b}$, $R^{4c}$, $R^{4d}$, $R^{4e}$, $R^{4f}$, and $R^{4g}$ each independently represents the same meaning as $R^3$ and $R^4$ in the general formula (II).

5. The nematic liquid crystal composition according to claim 4, comprising one, or two or more compounds selected from the group consisting of compounds represented by the general formula (I-A) and the general formula (I-B), and a compound represented by the general formula (II-A), the general formula (II-B), the general formula (II-C), or the general formula (II-F).

6. The nematic liquid crystal composition according to claim 2, comprising 1 kind or two compounds selected from the group consisting of compounds represented by general formulas (II-A-1) to (II-A-8):

[Chemical Formula 5]

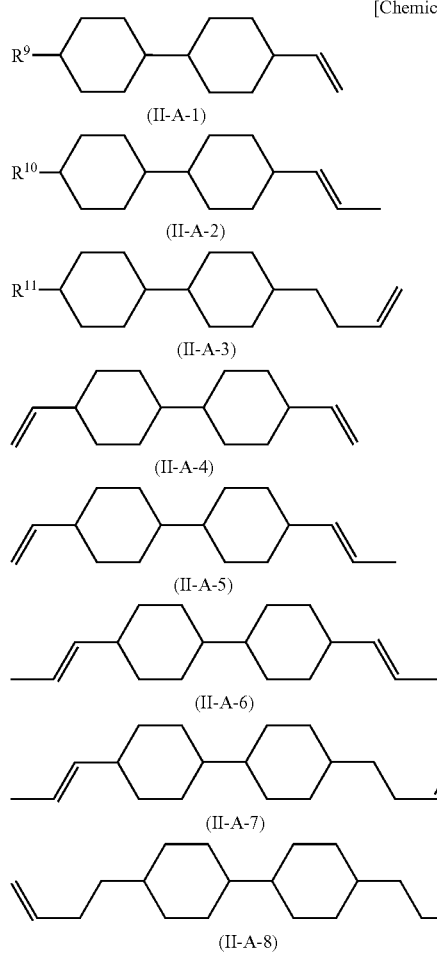

wherein each $R^9$, $R^{10}$, and $R^{11}$ each independently represents an alkyl group having 1 to 10 carbon atoms, and one $CH_2$ group or two or more unadjacent $CH_2$ groups existing in the groups may be substituted with O and/or S, and one, or two or more hydrogen atoms existing in the groups may be substituted with F or Cl).

7. The nematic liquid crystal composition according to claim 2, comprising one kind or two kinds of compounds selected from the group consisting of compounds represented by general formulas (II-B-1) to (II-B-7):

[Chemical Formula 6]

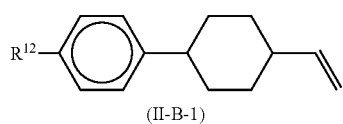

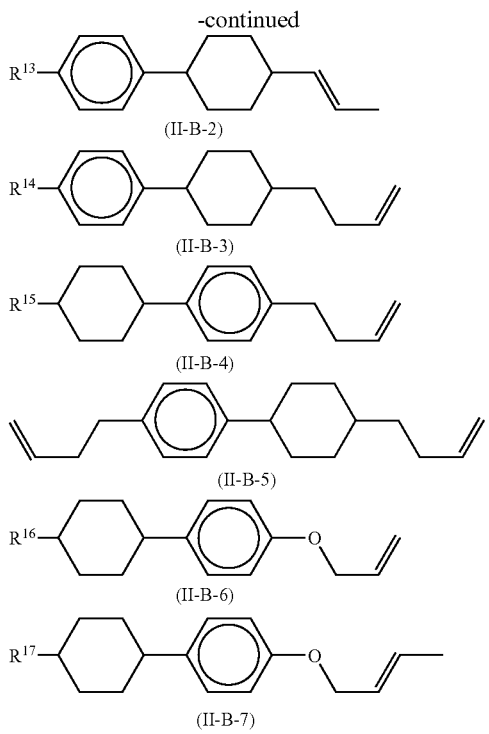

wherein $R^{12}$, $R^{13}$, $R^{14}$, $R^{15}$, $R^{16}$, and $R^{17}$ each independently represents an alkyl group having 1 to 10 carbon atoms, and one $CH_2$ group or two or more unadjacent $CH_2$ groups existing in the groups may be substituted with O and/or S, and one, or two or more hydrogen atoms existing in the groups may be substituted with F or Cl.

8. The nematic liquid crystal composition according to claim 2, comprising one kind or two compounds selected from the group consisting of compounds represented by general formulas (II-C-1) to (II-C-6):

[Chemical Formula 7]

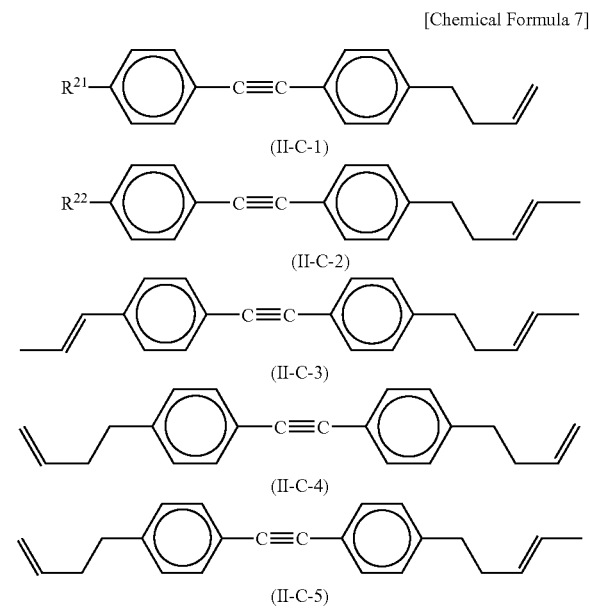

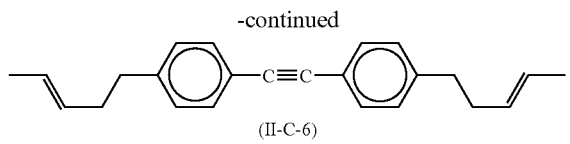

(II-C-6)

wherein $R^{21}$ and $R^{22}$ each independently represents an alkyl group having 1 to 10 carbon atoms, and one $CH_2$ group or two or more unadjacent $CH_2$ groups existing in the groups may be substituted with O and/or S, and one, or two or more hydrogen atoms existing in the groups may be substituted with F or Cl.

9. The nematic liquid crystal composition according to claim 2, comprising one kind or two compounds selected from the group consisting of compounds represented by general formulas (II-D-1) to (II-C-5):

[Chemical Formula 8]

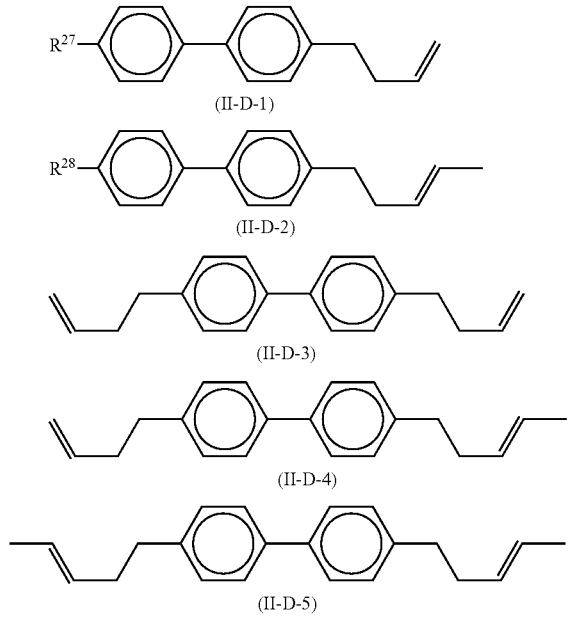

wherein $R^{27}$ and $R^{28}$ each independently represents an alkyl group having 1 to 10 carbon atoms, and one $CH_2$ group or two or more unadjacent $CH_2$ groups existing in the groups may be substituted with O and/or S, and one, or two or more hydrogen atoms existing in the groups may be substituted with F or Cl.

10. The nematic liquid crystal composition according to claim 6, comprising one, or two or more kinds of compounds selected from the group consisting of compounds represented by general formulas (I-A) and (I-B):

[Chemical Formula 9]

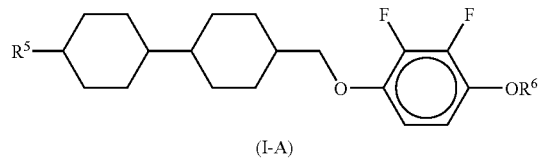

(I-A)

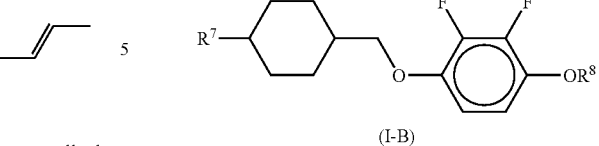

(I-B)

wherein $R^5$ and $R^7$ each independently represents the same meaning as $R^1$ in the general formula (I), and $R^6$ and $R^8$ each independently represents an alkyl group having 1 to 10 carbon atoms or an alkenyl group having 2 to 10 carbon atoms; and a compound represented by the general formula (II-A-1), the general formula (II-A-2), or the general formula (II-A-3).

11. The nematic liquid crystal composition according to claim 8, comprising one, or two or more compounds selected from the group consisting of compounds represented by general formulas (I-A) and (I-B):

[Chemical Formula 10]

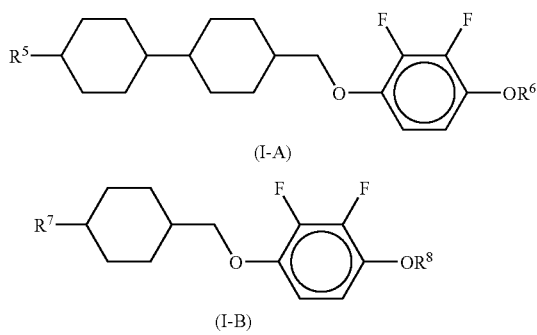

(I-A)

(I-B)

wherein $R^5$ and $R^7$ each independently represents the same meaning as $R^1$ in the general formula (I), and $R^6$ and $R^8$ each independently represents an alkyl group having 1 to 10 carbon atoms or an alkenyl group having 2 to 10 carbon atoms; and a compound represented by the general formula (II-C-1), the general formula (II-C-2), or the general formula (II-C-4).

12. The nematic liquid crystal composition according to claim 11, further comprising one, or two or more compounds selected from the group consisting of compounds represented by general formulas (III-A) to (III-J):

[Chemical Formula 11]

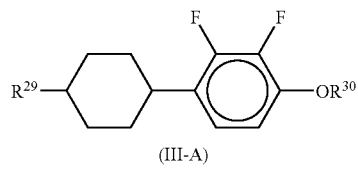

(III-A)

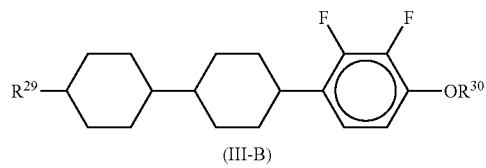

(III-B)

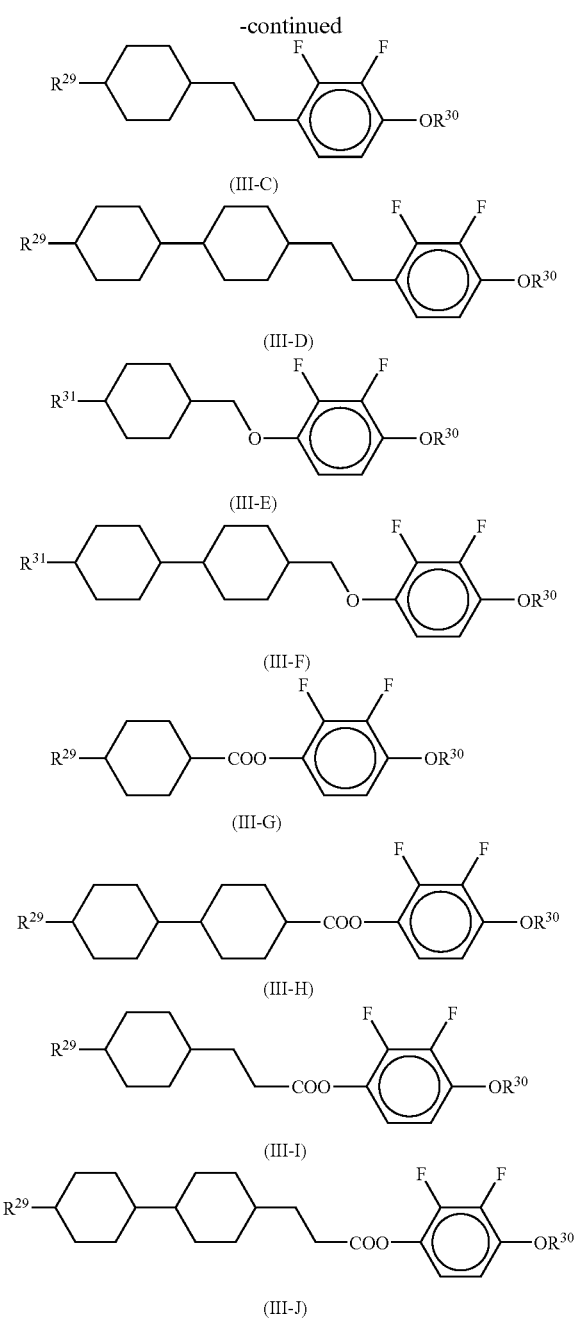

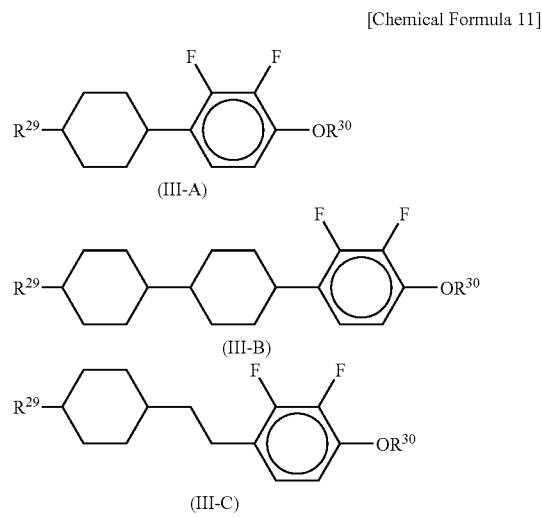

within a range from 10 to 30 mPa·s, and a transition temperature Tni of a nematic phase-isotropy liquid phase is within a range from 70 to 130° C.

14. A liquid crystal display device using the nematic liquid crystal composition according to claim 1.

15. A liquid crystal display device for active matrix drive, using the nematic liquid crystal composition according to claim 1.

16. A liquid crystal display device for a VA mode, an IPS mode, or an ECB mode, using the nematic liquid crystal composition according to claim 1.

17. The compound according to claim 1, wherein $R^2$ represents an alkoxyl group having 1 to 10 carbon atoms in the general formula (I).

18. The nematic liquid crystal composition according to claim 2, comprising one, or two or more compounds selected from the group consisting of compounds represented by general formulas (I-A) and (I-B):

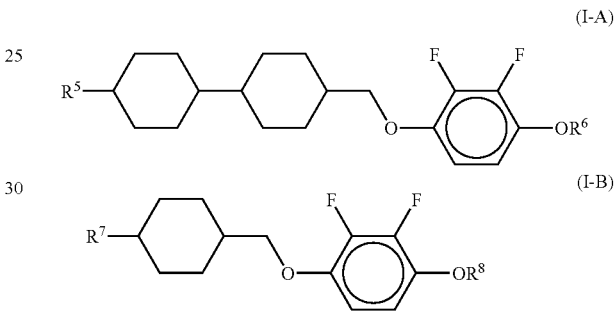

wherein $R^5$ and $R^7$ each independently represents the same meaning as $R^1$ in the general formula (I), and $R^6$ and $R^8$ each independently represents an alkyl group having 1 to 10 carbon atoms or an alkenyl group having 2 to 10 carbon atoms.

19. The nematic liquid crystal composition according to claim 1, further comprising one, or two or more compounds selected from the group consisting of compounds represented by general formulas (III-A) to (III-J):

[Chemical Formula 11]

wherein $R^{29}$ and $R^{30}$ each independently represents an alkyl group having 1 to 10 carbon atoms or an alkenyl group having 2 to 10 carbon atoms, one $CH_2$ group or two or more unadjacent $CH_2$ groups existing in the groups may be substituted with O and/or S, and one, or two or more hydrogen atoms existing in the groups may be substituted with F or Cl, and $R^{31}$ represents an alkyl group having 1 to 10 carbon atoms, one $CH_2$ group or two or more unadjacent $CH_2$ groups existing in the groups may be substituted with O and/or S, and one, or two or more hydrogen atoms existing in the groups may be substituted with F or Cl.

13. The nematic liquid crystal composition according to claim 1, wherein a dielectric anisotropy $\Delta\epsilon$ at 25° C. is within a range from −2.0 to −8.0, a refractive anisotropy $\Delta n$ at 25° C. is within a range from 0.06 to 0.16, a viscosity at 20° C. is

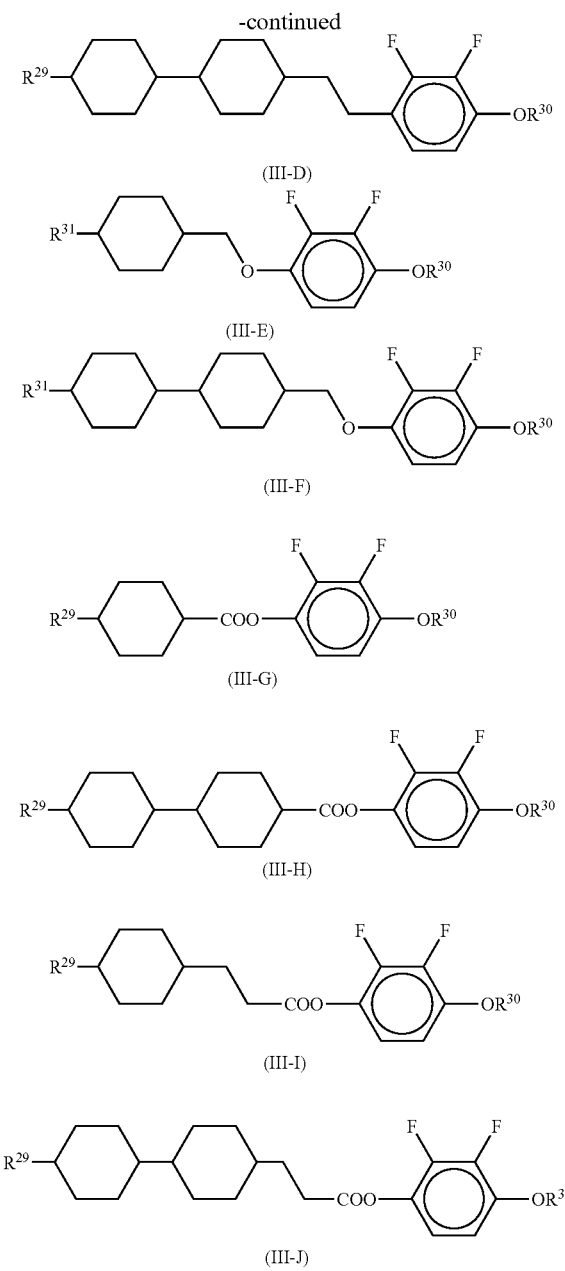

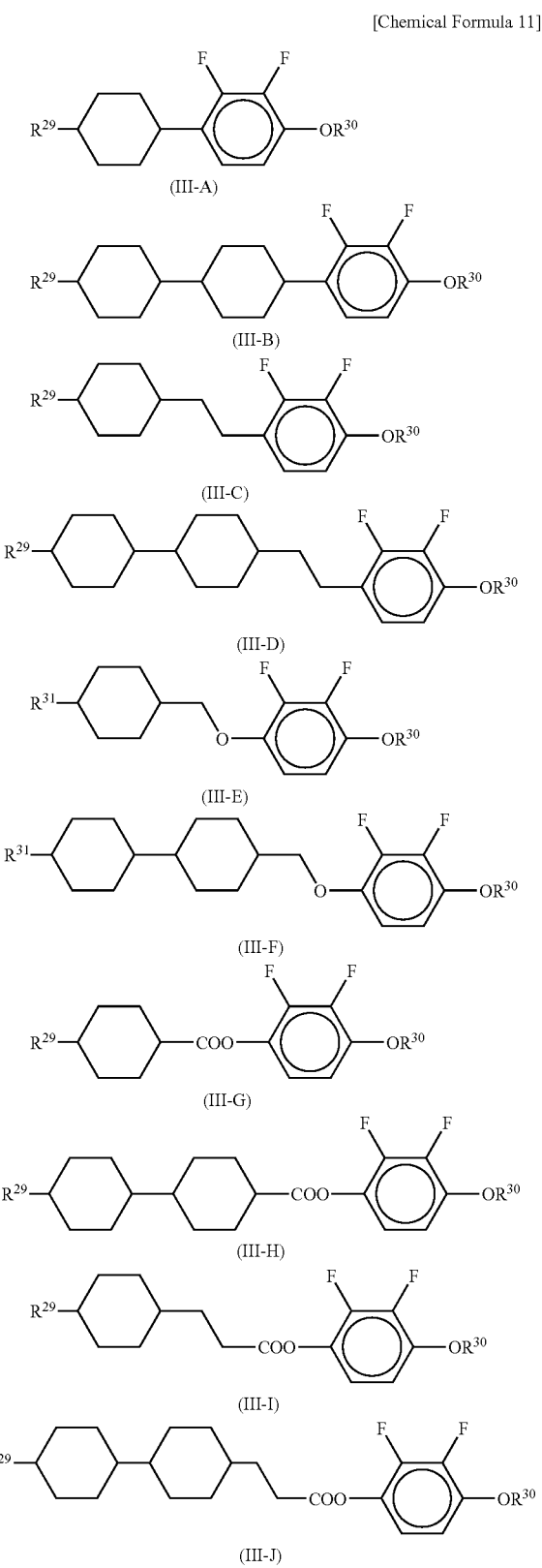

[Chemical Formula 11]

wherein $R^{29}$ and $R^{30}$ each independently represents an alkyl group having 1 to 10 carbon atoms or an alkenyl group having 2 to 10 carbon atoms, one $CH_2$ group or two or more unadjacent $CH_2$ groups existing in the groups may be substituted with O and/or S, and one, or two or more hydrogen atoms existing in the groups may be substituted with F or Cl, and $R^{31}$ represents an alkyl group having 1 to 10 carbon atoms, one $CH_2$ group or two or more unadjacent $CH_2$ groups existing in the groups may be substituted with O and/or S, and one, or two or more hydrogen atoms existing in the groups may be substituted with F or Cl.

20. The nematic liquid crystal composition according to claim 2, further comprising one, or two or more compounds selected from the group consisting of compounds represented by general formulas (III-A) to (III-J):

wherein $R^{29}$ and $R^{30}$ each independently represents an alkyl group having 1 to 10 carbon atoms or an alkenyl group having 2 to 10 carbon atoms, one $CH_2$ group or two or more unadjacent $CH_2$ groups existing in the groups may be substituted with O and/or S, and one, or two or more hydrogen atoms existing in the groups may be substituted with F or Cl, and $R^{31}$ represents an alkyl group having 1 to 10 carbon atoms, one $CH_2$ group or two or more unadjacent $CH_2$ groups existing in the groups may be substituted with O and/or S, and one, or two or more hydrogen atoms existing in the groups may be substituted with F or Cl.

21. The nematic liquid crystal composition according to claim 4, further comprising one, or two or more compounds selected from the group consisting of compounds represented by general formulas (III-A) to (III-J):

[Chemical Formula 11]

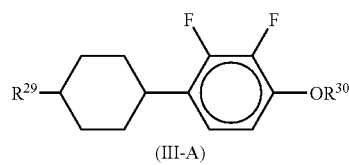

(III-A)

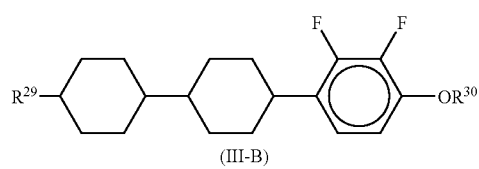

(III-B)

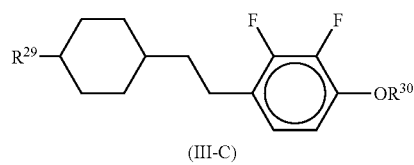

(III-C)

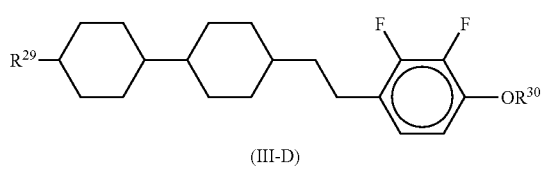

(III-D)

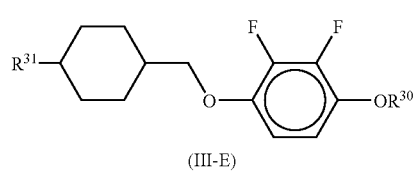

(III-E)

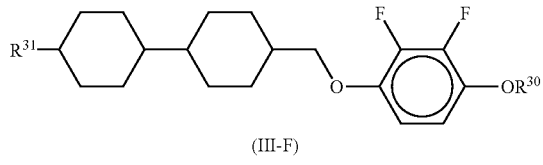

(III-F)

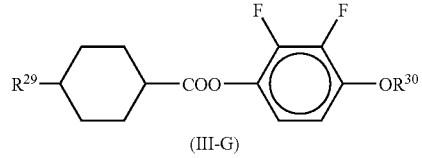

(III-G)

-continued

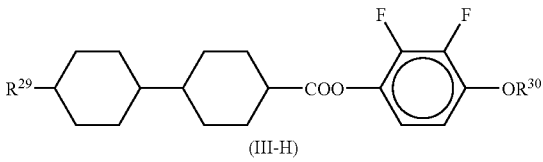

(III-H)

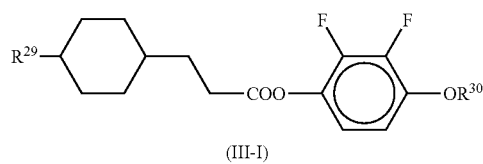

(III-I)

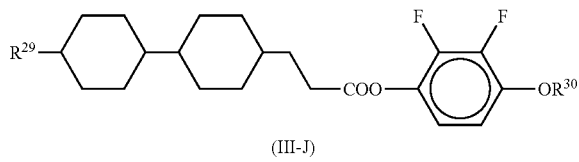

(III-J)

wherein $R^{29}$ and $R^{30}$ each independently represents an alkyl group having 1 to 10 carbon atoms or an alkenyl group having 2 to 10 carbon atoms, one $CH_2$ group or two or more unadjacent $CH_2$ groups existing in the groups may be substituted with O and/or S, and one, or two or more hydrogen atoms existing in the groups may be substituted with F or Cl, and $R^{31}$ represents an alkyl group having 1 to 10 carbon atoms, one $CH_2$ group or two or more unadjacent $CH_2$ groups existing in the groups may be substituted with O and/or S, and one, or two or more hydrogen atoms existing in the groups may be substituted with F or Cl.

22. The nematic liquid crystal composition according to claim 10, further comprising one, or two or more compounds selected from the group consisting of compounds represented by general formulas (III-A) to (III-J):

[Chemical Formula 11]

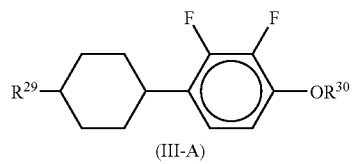

(III-A)

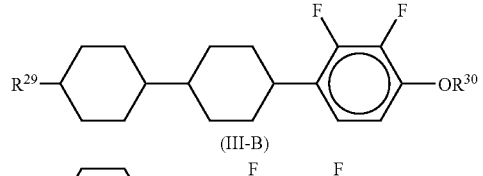

(III-B)

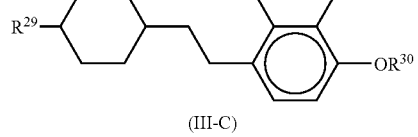

(III-C)

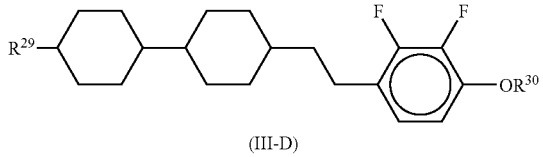

(III-D)

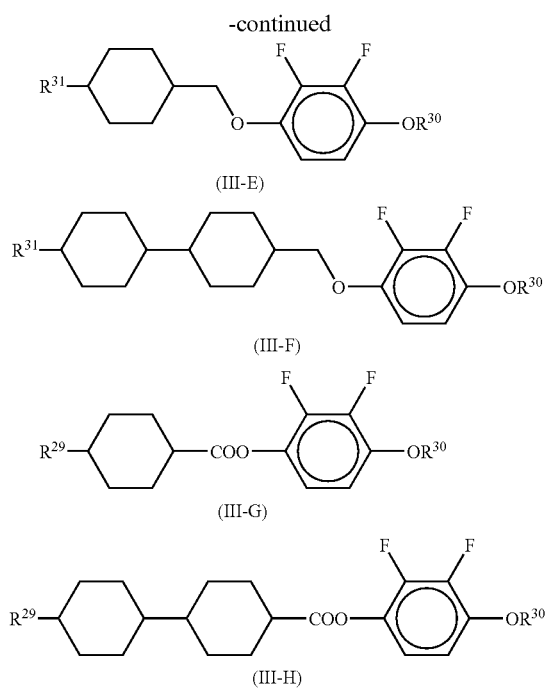
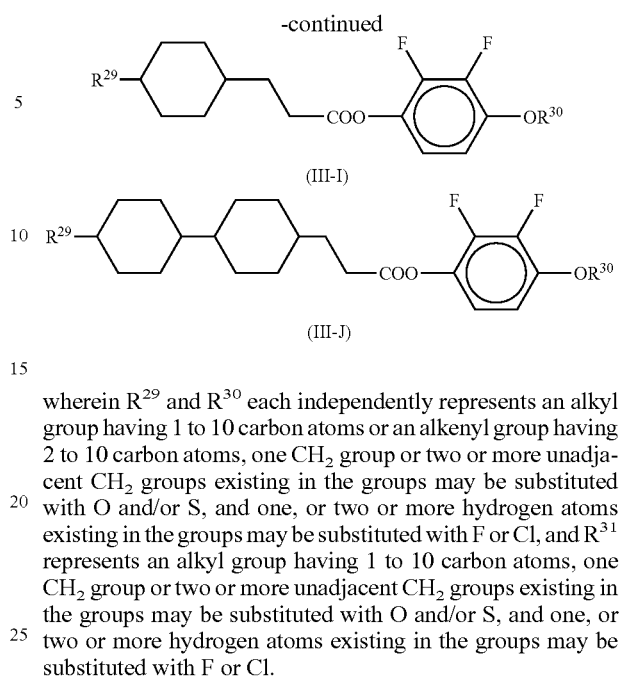

wherein $R^{29}$ and $R^{30}$ each independently represents an alkyl group having 1 to 10 carbon atoms or an alkenyl group having 2 to 10 carbon atoms, one $CH_2$ group or two or more unadjacent $CH_2$ groups existing in the groups may be substituted with O and/or S, and one, or two or more hydrogen atoms existing in the groups may be substituted with F or Cl, and $R^{31}$ represents an alkyl group having 1 to 10 carbon atoms, one $CH_2$ group or two or more unadjacent $CH_2$ groups existing in the groups may be substituted with O and/or S, and one, or two or more hydrogen atoms existing in the groups may be substituted with F or Cl.

* * * * *